US010219200B2

(12) United States Patent
Yoon et al.

(10) Patent No.: US 10,219,200 B2
(45) Date of Patent: Feb. 26, 2019

(54) APPARATUS AND METHOD FOR LINK SETUP IN WIRELESS COMMUNICATION SYSTEM

(71) Applicant: Samsung Electronics Co., Ltd., Gyeonggi-do (KR)

(72) Inventors: Sungrok Yoon, Seoul (KR); Young Myoung Kang, Gyeonggi-do (KR); Changyeul Kwon, Gyeonggi-do (KR); Myounghwan Lee, Gyeonggi-do (KR); Doyoung Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/090,592

(22) Filed: Apr. 4, 2016

(65) Prior Publication Data

US 2016/0295502 A1    Oct. 6, 2016

(30) Foreign Application Priority Data

Apr. 2, 2015  (KR) .................... 10-2015-0046905

(51) Int. Cl.
*H04W 4/00* (2018.01)
*H04W 48/16* (2009.01)
*H04W 52/02* (2009.01)

(52) U.S. Cl.
CPC ....... *H04W 48/16* (2013.01); *H04W 52/0216* (2013.01); *H04W 52/0229* (2013.01);
(Continued)

(58) Field of Classification Search
CPC ............. H04W 48/16; H04W 52/0216; H04W 52/0229; Y02B 60/20
(Continued)

(56) References Cited

U.S. PATENT DOCUMENTS 7,953,119 B2*  5/2011  Cho ................... H04J 11/0093
                                                       370/328
8,369,255 B2*  2/2013  Umatt ............... H04W 52/0241
                                                       370/311
(Continued)

FOREIGN PATENT DOCUMENTS

WO    WO 2013/090751 A1    6/2013
WO        2013149189 A1    10/2013
(Continued)

OTHER PUBLICATIONS

IEEE Standard for Information Technology; Part 11: Wireless LAN Medium Access Control (MAC) and Physical Layer (PHY) Specifications; Amend. 3; 2012; 628 pages.
(Continued)

*Primary Examiner* — Marceau Milord

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Link setup using different Radio Access Technologies (RATs) in a wireless communication system is provided. A method for operating a device supporting a first RAT and a second RAT includes sending information notifying a discovery interval start time for the second RAT, using the first RAT, and sending discovery signals during the discovery interval using the second RAT.

20 Claims, 25 Drawing Sheets

(52) U.S. Cl.
CPC .......... *Y02D 70/00* (2018.01); *Y02D 70/1262* (2018.01); *Y02D 70/142* (2018.01); *Y02D 70/144* (2018.01); *Y02D 70/166* (2018.01); *Y02D 70/21* (2018.01)

(58) Field of Classification Search
USPC .............................. 455/434, 435.1, 436, 525
See application file for complete search history.

(56) References Cited

U.S. PATENT DOCUMENTS

| | | | | |
|---|---|---|---|---|
| 8,503,377 | B2 | 8/2013 | Cordeiro et al. | |
| 8,594,054 | B2* | 11/2013 | Chin | H04W 24/10 370/335 |
| 8,817,623 | B2* | 8/2014 | Gupta | H04W 28/0215 370/235 |
| 8,873,506 | B2* | 10/2014 | Lerzer | H04W 88/06 370/331 |
| 8,908,656 | B2* | 12/2014 | Sadek | H04W 72/1215 370/252 |
| 8,923,244 | B2* | 12/2014 | Tinnakornsrisuphap | H04W 36/04 370/331 |
| 8,989,145 | B2* | 3/2015 | Das | H04W 36/0083 370/330 |
| 9,008,659 | B1* | 4/2015 | Choi | H04W 36/04 370/331 |
| 9,036,603 | B2* | 5/2015 | Johnsson | H04W 24/04 370/329 |
| 9,066,240 | B2* | 6/2015 | Sadek | H04W 16/14 |
| 9,084,180 | B2* | 7/2015 | Sampath | H04W 48/16 |
| 9,306,686 | B2* | 4/2016 | McIntyre | H04H 60/33 |
| 9,544,798 | B1* | 1/2017 | Ahmadzadeh | H04W 24/08 |
| 2006/0223574 | A1* | 10/2006 | Chandra | H04W 88/06 455/552.1 |
| 2007/0086378 | A1* | 4/2007 | Matta | H04W 24/10 370/329 |
| 2010/0014502 | A1* | 1/2010 | Singh | H04B 7/12 370/343 |
| 2010/0046455 | A1* | 2/2010 | Wentink | H04W 36/06 370/329 |
| 2011/0153773 | A1* | 6/2011 | Vandwalle | H04W 8/005 709/217 |
| 2011/0199918 | A1 | 8/2011 | Sampath et al. | |
| 2012/0120892 | A1* | 5/2012 | Freda | H04W 8/005 370/329 |
| 2014/0038597 | A1* | 2/2014 | Wang | H04W 36/165 455/434 |
| 2014/0082185 | A1* | 3/2014 | Abraham | H04W 24/00 709/224 |
| 2014/0293992 | A1* | 10/2014 | Abraham | H04W 52/0225 370/350 |
| 2014/0341109 | A1* | 11/2014 | Cartmell | H04L 45/308 370/328 |
| 2015/0230263 | A1* | 8/2015 | Roy | H04W 36/0083 455/452.2 |
| 2015/0373572 | A1* | 12/2015 | Sahin | H04W 72/1231 370/252 |
| 2016/0043843 | A1* | 2/2016 | Liu | H04L 5/0048 370/329 |
| 2016/0066330 | A1* | 3/2016 | Centonza | H04W 72/044 370/329 |
| 2016/0080963 | A1* | 3/2016 | Marinier | H04L 5/0053 370/252 |
| 2016/0100449 | A1* | 4/2016 | Jang | H04W 76/026 370/252 |
| 2016/0119942 | A1* | 4/2016 | Wang | H04W 72/1215 370/336 |
| 2016/0150474 | A1* | 5/2016 | Ang | H04W 52/0216 370/311 |
| 2016/0165630 | A1* | 6/2016 | Oteri | H04W 74/04 370/336 |
| 2016/0219475 | A1* | 7/2016 | Kim | H04W 76/025 |
| 2016/0227526 | A1* | 8/2016 | Park | H04L 5/0048 |
| 2016/0337007 | A1* | 11/2016 | Seyedmehdi | H04B 7/024 |
| 2016/0353348 | A1* | 12/2016 | Lee | H04W 36/22 |

FOREIGN PATENT DOCUMENTS

| | | |
|---|---|---|
| WO | 2013172755 A1 | 11/2013 |
| WO | WO 2014/021998 A2 | 2/2014 |
| WO | WO 2014/047125 A1 | 3/2014 |
| WO | 2014124237 A1 | 8/2014 |
| WO | WO 2014/160543 A1 | 10/2014 |
| WO | 2015006637 A1 | 1/2015 |

OTHER PUBLICATIONS

International Search Report dated Jul. 13, 2016 in connection with International Patent Application No. PCT/KR2016/003233.
Written Opinion of the International Searching Authority dated Jul. 13, 2016 in connection with International Patent Application No. PCT/KR2016/003233.
Partial European Search Report regarding Application No. 16773424.3, dated Mar. 8, 2018, 17 pages.
Extended European Search Report regarding Application No. 16773424.3, dated May 25, 2018, 19 pages.

* cited by examiner

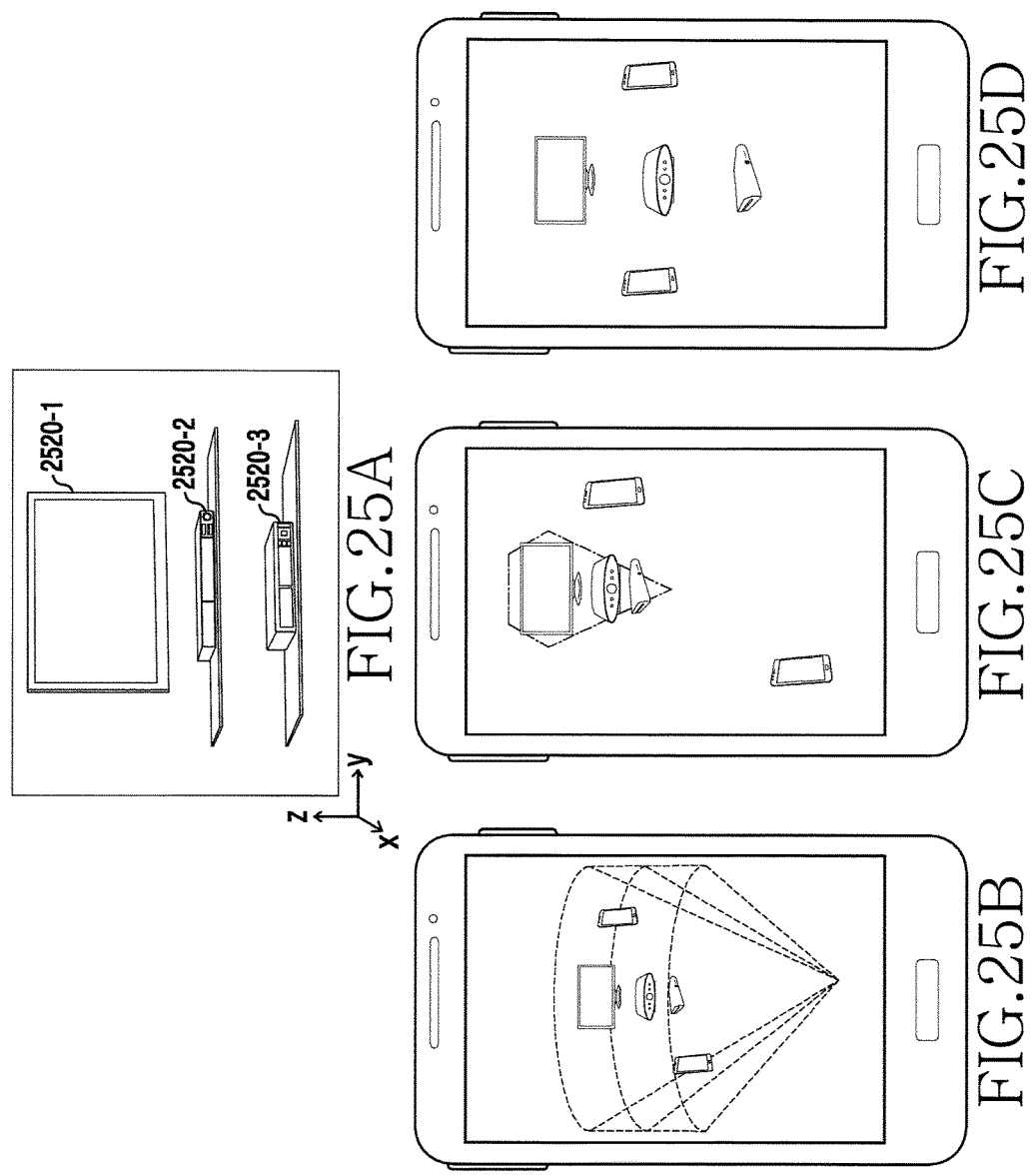

APPARATUS AND METHOD FOR LINK SETUP IN WIRELESS COMMUNICATION SYSTEM

CROSS-REFERENCE TO RELATED APPLICATION AND CLAIM OF PRIORITY

The present application is related to and claims benefit under 35 U.S.C. § 119(a) to a Korean patent application filed in the Korean Intellectual Property Office on Apr. 2, 2015, and assigned Serial No. 10-2015-0046905, the entire disclosure of which is hereby incorporated by reference.

TECHNICAL FIELD

The present disclosure relates generally to link setup in a wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud Radio Access Network (RAN) as the above-described Big Data processing technology may also be considered to be as an example of convergence between the 5G technology and the IoT technology.

In addition, thanks to advances in wireless communications, various devices are wirelessly connected. Compared with wired connection, the wireless connection offers various advantages, for example, improved mobility, enhanced device design, low damage risk, and so on. The wired connection can enable intuitive device connection using a physical connector, whereas various standards of the wireless connection cannot be distinguished with unaided eyes. Further, an access process for the wireless connection differs per standard, which can cause inconvenience to a user.

Hence, various technologies are under development in order to lessen the inconvenience of the wireless connection and to establish the wireless connection fast and intuitively. For example, in Wireless Fidelity (Wi-Fi) connection, when tagging or proximity is determined using Near Field Communications (NFC) or Bluetooth Low Energy (BLE), the NFC or the BLE can exchange necessary information for the Wi-Fi connection and conduct the fast Wi-Fi connection. Such a technology is standardized by Application Specific Platform (ASP) 2.0 Task Group (TG) of Wi-Fi Alliance (WFA).

As discussed above, in link setup using a specific Radio Access Technology (RAT), necessary information can be exchanged using another RAT. In this case, since characteristics of the RATs are different, a single process cannot support every combination of the RATs. Hence, what is needed is an efficient access process in consideration of the characteristics of the RAT.

SUMMARY

To address the above-discussed deficiencies it is a primary object to provide an apparatus and a method for efficiently setting a link using a plurality of Radio Access Technologies (RATs) in a wireless communication system.

Another aspect of the present disclosure is to provide an apparatus and a method for supporting an efficient connection process in consideration of RAT characteristics in a wireless communication system.

Yet another aspect of the present disclosure is to provide an apparatus and a method for supporting a connection process in consideration of RAT characteristics in a wireless communication system.

Still another aspect of the present disclosure is to provide an apparatus and a method for reducing energy consumption for link setup in a wireless communication system.

A further aspect of the present disclosure is to provide an apparatus and a method for setting a link using another RAT of a different coverage in a wireless communication system.

A further aspect of the present disclosure is to provide an apparatus and a method for synchronizing a discovery interval for a second RAT using a first RAT in a wireless communication system.

According to one aspect of the present disclosure, a method for operating a device supporting a first RAT and a second RAT includes sending information notifying a start time of a discovery interval for the second RAT, using the first RAT, and sending discovery signals during the discovery interval using the second RAT.

According to another aspect of the present disclosure, a method for operating a device supporting a first RAT and a second RAT includes receiving information notifying a start time of a discovery interval for the second RAT, using the first RAT, and receiving a discovery signal during the discovery interval using the second RAT.

According to yet another aspect of the present disclosure, a device for supporting a first RAT and a second RAT includes a first communication module configured to send information notifying a start time of a discovery interval for the second RAT, using the first RAT, and a second communication module configured to send discovery signals during the discovery interval using the second RAT.

According to still another aspect of the present disclosure, a device for supporting a first RAT and a second RAT includes a first communication module configured to receive information notifying a start time of a discovery interval for the second RAT, using the first RAT, and a second communication module configured to receive discovery signals during the discovery interval using the second RAT.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 25A through 25D illustrate interfaces displaying neighboring devices in an electronic device according to an embodiment of the present disclosure.

Throughout the drawings, like reference numerals will be understood to refer to like parts, components and structures.

DETAILED DESCRIPTION

Figure 1:
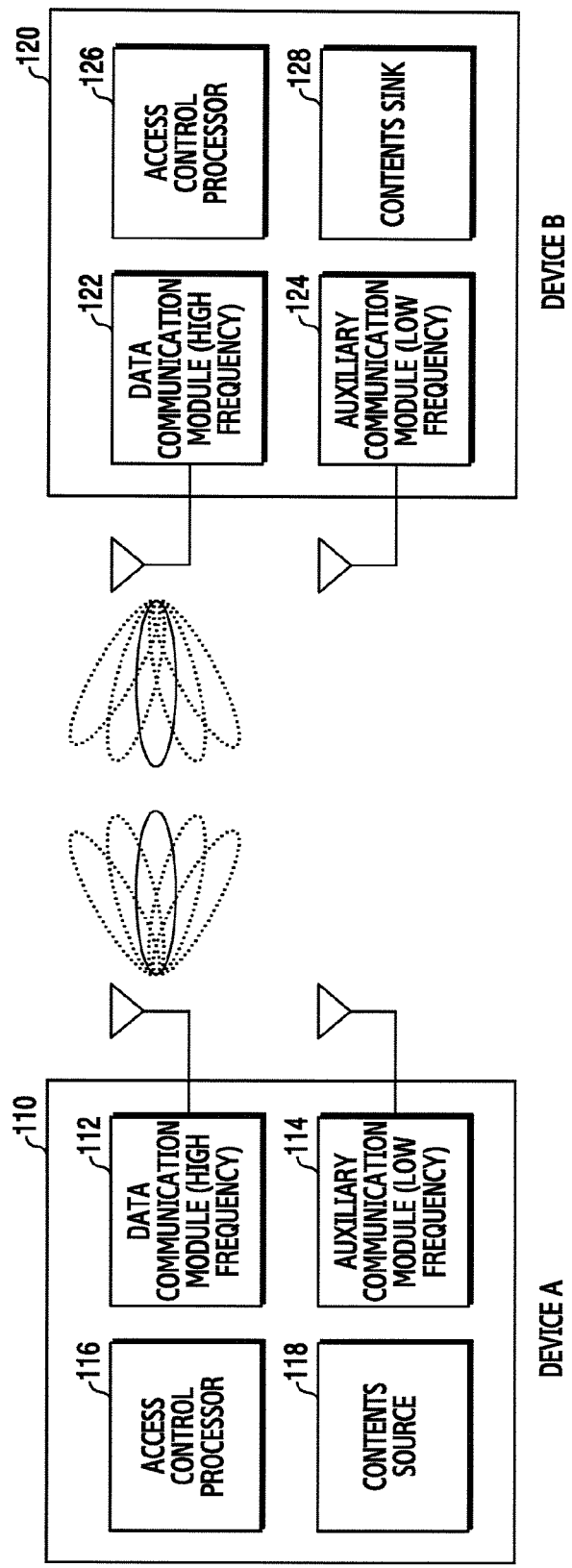
FIG. 1 illustrates devices for link setup in a wireless communication system according to an embodiment of the present disclosure.

FIGS. 1 through 25D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system. The following description with reference to the accompanying drawings is provided to assist in a comprehensive understanding of embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of embodiments of the present disclosure is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present disclosure provide an apparatus and a method for efficiently setting a link using a plurality of Radio Access Technologies (RATs) in a wireless communication system, and more specifically, an apparatus and a method for achieving fast connection and efficiency energy management between devices supporting different RATs.

Hereinafter, terms indicating the RATs, terms indicating bands used by the RATS, terms indicating devices, terms indicating signal types, terms indicating resources or time intervals for the link setup, and terms indicating connection states are described merely by way of example. It should be understood that the present disclosure is not limited to those terms and can adopt other equivalent terms.

To ease the understanding, the present disclosure employs, but is not limited to, terms and names defined in a particular communication standard (e.g., Bluetooth Low Energy (BLE) or Wireless Fidelity (Wi-Fi)). However, the present disclosure can be equally applied to other standard systems.

To enhance connection efficiency using different RATs, electronic devices can change link setup information of a RAT to use for data communication, using another auxiliary RAT in advance. For example, authentication information and Internet Protocol (IP) allocation information required in the RAT for the data communication are exchanged in advance, and thus a connection process can be simplified and a connection time can be shortened. A band occupied by the RAT for the data communication can be referred to as an In-Band (TB), and a band occupied by the auxiliary RAT can be referred to as an Out-Of-Band (OOB). Hereafter, the IB and the OOB can indicate not only a physical frequency band but also the corresponding RAT.

Wireless communication coverage is mostly related to signal strength. Accordingly, it is common that, when the connection is feasible in the OOB, IB connection is also allowed. That is, it is presumed that the wireless communication coverage of the OOB is similar to or smaller than the wireless communication coverage of the D3. In a combination of some communication standards (e.g., Near Field Communications (NFC)/Bluetooth and Wi-Fi), it is presumed that the coverage is similar or smaller.

However, when the D3 adopts a super high-speed RAT using a high frequency, the above premise may not be valid. When the wireless communication frequency rises, it is easy to secure a bandwidth and thus a data rate can increase. However, due to characteristics of a high-frequency signal, the wireless communication range, that is, the coverage is generally narrowed. For example, compared with the BLE using 2.4 GHz band, Wi-Fi Gigabites (WiGig) using 60 GHz band is subject to a distance-based signal loss 100 times or more. In addition, since signal diffraction or penetration degrades, the communication is feasible only in limited situations.

The high-frequency wireless communication mostly performs beamforming in order to overcome the signal loss. The beamforming imposes directivity on the signal and thus increases a signal gain. Hence, in the link setup, beam training for the beamforming may need to be considered.

As such, it is difficult to maximize the link setup efficiency in the IB of high-frequency or different coverage merely using the information exchange using the OOB. Thus, the present disclosure provides various embodiments for the link setup based on interoperation between the IB and the OOB of high-frequency or smaller coverage.

FIG. 1 depicts devices for link setup in a wireless communication system according to an embodiment of the present disclosure. While two devices 110 and 120 are disclosed in FIG. 1, three or more devices can be employed.

Referring to FIG. 1, the device A 110 and the device B 120 can be portable electronic devices, and can include one of a smart phone, a portable terminal, a mobile phone, a mobile pad, a media player, a tablet computer, a handheld computer, a Personal Digital Assistant (PDA), an Access Point (AP), a printer, a camera, and other electronic communication device, or a device combining two or more functions of these devices. The device A 110 and the device B 120 can be smart home electronic devices, and can include one of a Television (TV), a Personal Computer (PC), a speaker, a set-top box, a console gaming device, and an electronic communication device, or a device combining two or more functions of these devices. The device A 110 includes a data communication module 112, an auxiliary communication module 114, an access control processor 116, and a contents source 118. The device B 120 includes a data communication module 122, an auxiliary communication module 124, an access control processor 126, and a contents sink 128.

The device A 110 and the device B 120 can include a plurality of wireless communication means and thus support a plurality of RATs. The data communication modules 112 and 122 of the device A 110 and the device B 120 support a second RAT using a high frequency, and the auxiliary communication modules 114 and 124 support a first RAT using a relatively low frequency. For example, the second RAT can use 28 GHz, 39 GHz, 60 GHz, and 70 GHz bands, and the first RAT can use 900 MHz, 2 GHz, 2.4 GHz, and 5 GHz bands. The device A 110 and the device B 120 can transmit high-quality contents fast at a high data rate through the data communication modules 112 and 122. By contrast, the device A 110 and the device B 120 can exchange control and management information with relatively low power consumption through the auxiliary communication modules 114 and 124.

The access control processor 116 of the device A 110 can perform a connection process based on interoperation of different RATs by controlling the data communication module 112 and the auxiliary communication module 114. Similarly, the access control processor 126 of the device B 120 can perform a connection process based on the interoperation of different RATs by controlling the data communication module 122 and the auxiliary communication module 124. The device A 110 and the device B 120 can store and play contents using the contents source 118 and the contents sink 128.

Figure 2:
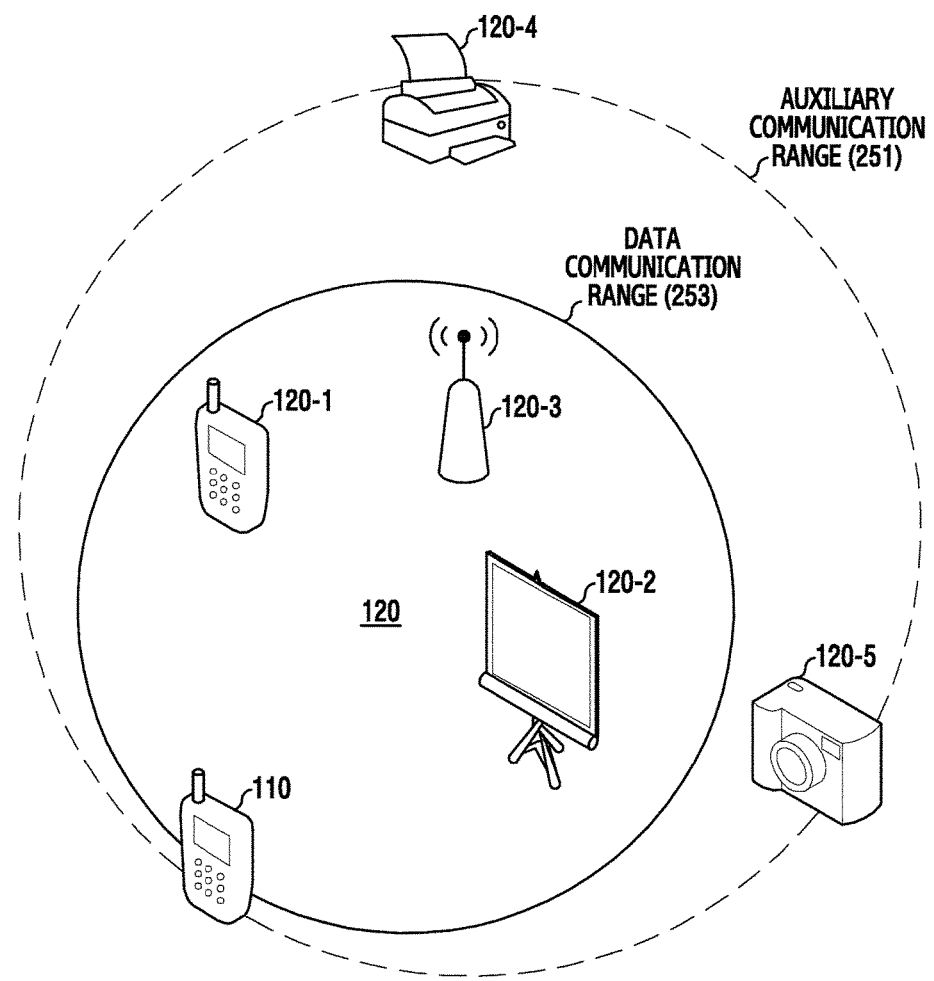
FIG. 2 illustrates coverage difference of Radio Access Technologies (RATs) in a wireless communication system according to an embodiment of the present disclosure.

FIG. 2 depicts coverage difference of RATs in a wireless communication system according to an embodiment of the present disclosure. In FIG. 2, a plurality of devices 110 and 120-1 through 120-5 is distributed.

Referring to FIG. 2, a user of the device A 110 wants to establish a link with one or more of the devices 120-1 through 120-5 using the device A 110. Coverage of the first RAT used for the pre-communication is an auxiliary communication range 251, and coverage of the second RAT used for the data communication is a data communication range 253. That is, since the second RAT uses a high frequency, the data communication range 253 is narrower than the auxiliary communication range 251.

The device B1 120-1, the device B2 120-2, and the device B3 120-3 in the data communication range 253 can enable both of the data communication and the auxiliary communication. However, the device B4 120-4 and the device B5 120-5 can enable only the auxiliary communication. Accordingly, the device A 110 can discover the devices 120-1 through 120-5 as the connectable devices using the first RAT but cannot perform the data communication with the device B4 120-4 and the device B5 120-5 of the discovered devices using the second RAT.

Figure 3:
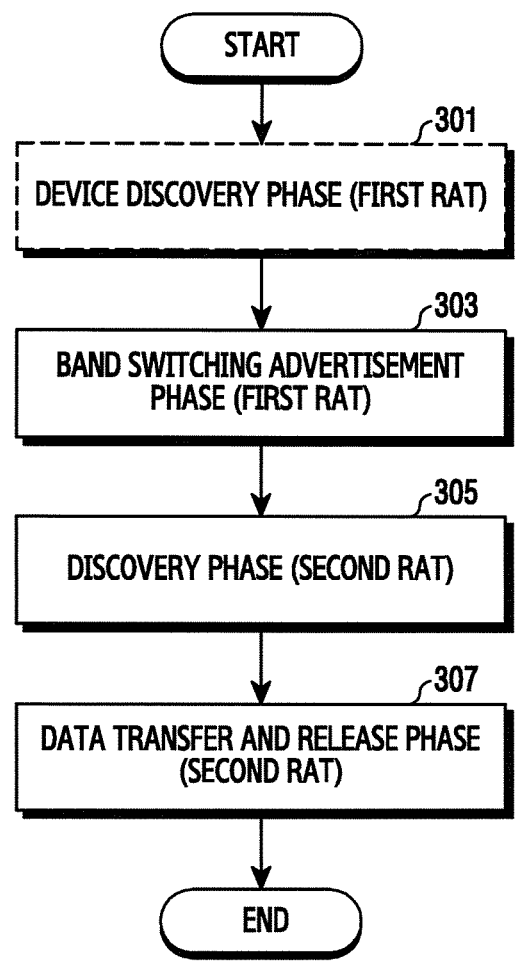
FIG. 3 illustrates a link setup process in a wireless communication system according to an embodiment of the present disclosure.

FIG. 3 illustrates a link setup process in a wireless communication system according to an embodiment of the present disclosure.

Referring to FIG. 3, in operation 301, a device discovery phase using a first RAT (e.g., BLE) is performed. The device A 110 discovers a neighboring device using the auxiliary communication module 114 (e.g., a BLE module) and obtains a device list. Referring back to FIG. 2, the devices 120-1 through 120-5 can be discovered. That is, the operation 301 is a pre-discovery phase using the auxiliary communication module 114. In various embodiments, the operation 301 can be omitted and is supported only in particular setting of subsequent processes. This is because a relative communication range is limited due to the high frequency of the data communication and thus the connection with the other devices of the device list obtained in the operation 301 using the second RAT is not ensured.

In operation 303, a band switching advertisement phase is conducted. In the band switching advertisement phase, the device A 110 announces band switching using the auxiliary communication module 114. That is, the device A 110 sends a signal notifying the band switching. Other devices receiving the signal selectively enable the data communication module 122. Referring back to FIG. 2, all or some of the other devices 120-1 through 120-5 can enable the data communication module 122 (e.g., a Wi-Fi module).

In operation 305, a discovery phase for the second RAT (e.g., high-frequency Wi-Fi) is conducted. In the discovery phase, the device A 110 and the other devices 120-1 through 120-5 perform the beamforming, and determine a beamforming map or a device map or determine accessibility based on received signal strength. That is, the device A 110 can perform the beam training on the other devices 120-1 through 120-5 and determine whether to set a link. The data communication can be conducted in future with at least one accessible device.

In operation 307, a data transfer and release phase is conducted. In the data transfer and release phase, the user designates or selects one or more other devices for the link setup in the device list or through a User Interface (UI)/User Experience (UX) which substitutes the list. Hence, the device A 110 sets a communication link with the selected device and transfers contents according to an executed service. In addition, the device A 110 can notify no access to the other device residing outside the data communication range or not selected, through the auxiliary communication module 114. In this case, the other device can disable the data communication module 122.

In FIG. 3, the device A 110, which controls the discovery phase, can be referred to as a control device. The other devices 120-1 through 120-5, which are connectable with the device A 110 using the first RAT, are communication candidates using the second RAT, and thus can be referred to as candidate devices. Since the other devices 120-1 through 120-5 reside in the second RAT coverage and share data with the device A 110, they can be referred to as sharing devices.

The link setup procedure according to an embodiment shown in FIG. 3 cannot determine a time when user's intervention is available merely using the auxiliary communication, that is, the second RAT communication. This is because it is necessary to determine whether to perform the data communication in consideration of characteristics (e.g., short propagation distance, poor penetration, diffraction, and the like) of the high-frequency communication of the second RAT, and such a determination may need to apply to a radio link using the second RAT for the data communication. When the second RAT requires the beamforming, the beamforming cannot be conducted using the first RAT. Further, when the first RAT is used to locate the candidate devices 120 to connect and to provide the location in response to a user's selection, an additional operation of the data communication module, that is, the communication module for the first RAT is required prior to the user's intervention. Hence, the present link setup process and its details are distinguished from the related art.

Detailed operations of the band switching and the device discovery for the data communication can affect the connection performance. The band switching and the discovery are now explained.

The discovery process commences when the control device 110 sends a broadcasting signal notifying the band switching using the first RAT. The broadcasting signal can be referred to as a broadcasting frame or a broadcasting message. The broadcasting signal includes information notifying when to switch the band, and such information is updated in every transmission with the remaining time until the band switching. Hence, the control device 110 and the candidate devices 120 can synchronize their timer for the discovery interval using the second RAT.

Figure 4:
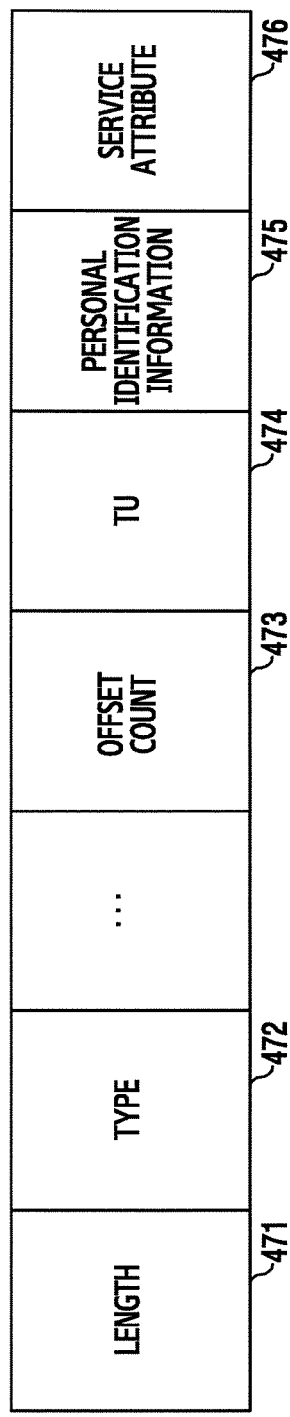
FIG. 4 illustrates a broadcasting signal in a wireless communication system according to an embodiment of the present disclosure.

For example, the broadcasting signal can include at least one of parameters as shown in FIG. 4. FIG. 4 depicts a broadcasting signal in a wireless communication system according to an embodiment of the present disclosure. Referring to FIG. 4, the broadcasting signal can include at least one of a length 471, a type 472, an offset count 473, a Time Unit (TU) 474, personal identification information 475, and a service attribute 476.

The length 471 indicates a length of the broadcasting signal, and the type 472 indicates that the broadcasting signal is a frame or a message notifying the band switching. The offset count 473 and the TU 474 indicate the remaining time until the band switching. More specifically, when the broadcasting signal is transmitted in every TU, the offset count 473 reduces by one in every transmission and the TU 474 indicates a time duration of one TU. The personal identification information 475 is identification information of the user of the control device 110 or the control device 110 sending the broadcasting signal. The personal identification information 475 can be used for the candidate devices 120 to determine whether to try the link setup with the control device 110. For example, the personal identification information 475 can include a phone number.

The service attribute 476 indicates an attribute of the service to be initiated by the control device 110. For example, the service attribute 476 can indicate at least one of whether a high data transfer rate is needed, a security level, and an application to initiate. The service attribute 476 can be used to variably operate the beam search in the discovery phase, that is, in the operation 305 of FIG. 3. For example, when the service requires a high data rate, the control device 110 can narrow a bandwidth to increase the signal quality and sweep a plurality of beam sectors. When the service requires a high security level, the control device 110 can expand the bandwidth to reduce the signal transmission range and sweep a small number of beam sectors.

Details of the discovery phase can vary depending on whether an Acknowledgement (ACK) for the broadcasting signal is used or not. Without using the ACK, the control device 110 repeatedly sends the broadcasting signal for a preset number of times and then switches the band. By contrast, using the ACK, the candidate devices 120 receiving the broadcasting signal respond with an ACK using another broadcasting signal. The control device 110 can determine that all of the candidate devices 120 respond by comparing the devices sending the ACK with a list of the discovered or known devices, suspend the broadcasting signal transmission, and thus save channel resources.

As the number of the candidate devices 120 increases, the former method without using the ACK is more advantageous. As the number of the candidate devices 120 decreases, the latter method using the ACK is more advantageous. Depending on a service or content sharing range, the two methods are selectively operated. When the time for the band switching arrives, the candidate devices 120 enable the communication module for the second RAT and prepare a secondary discovery process. In so doing, a guard time can be applied after the band switching time by considering a timer error of the candidate devices 120 or a delay in enabling the data communication module.

Figure 5:
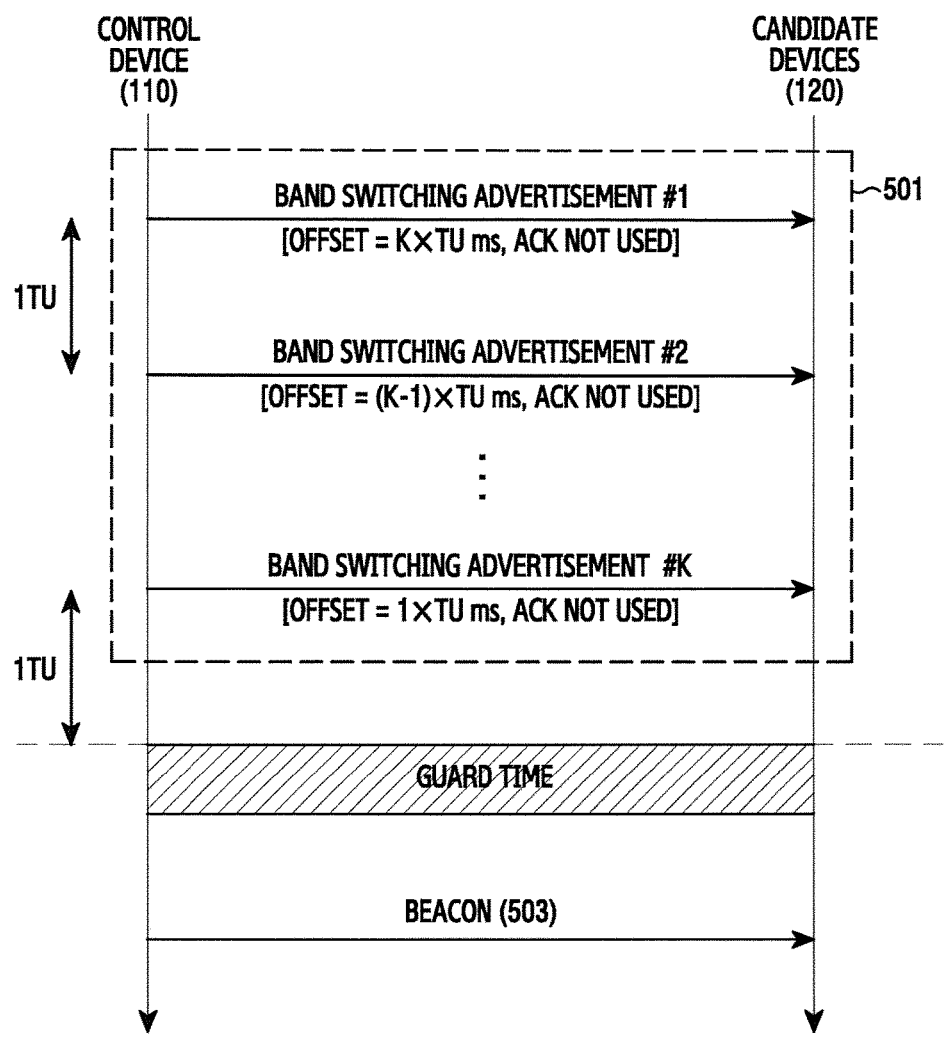
FIG. 5 illustrates discovery interval synchronization in a wireless communication system according to an embodiment of the present disclosure.
Figure 8:
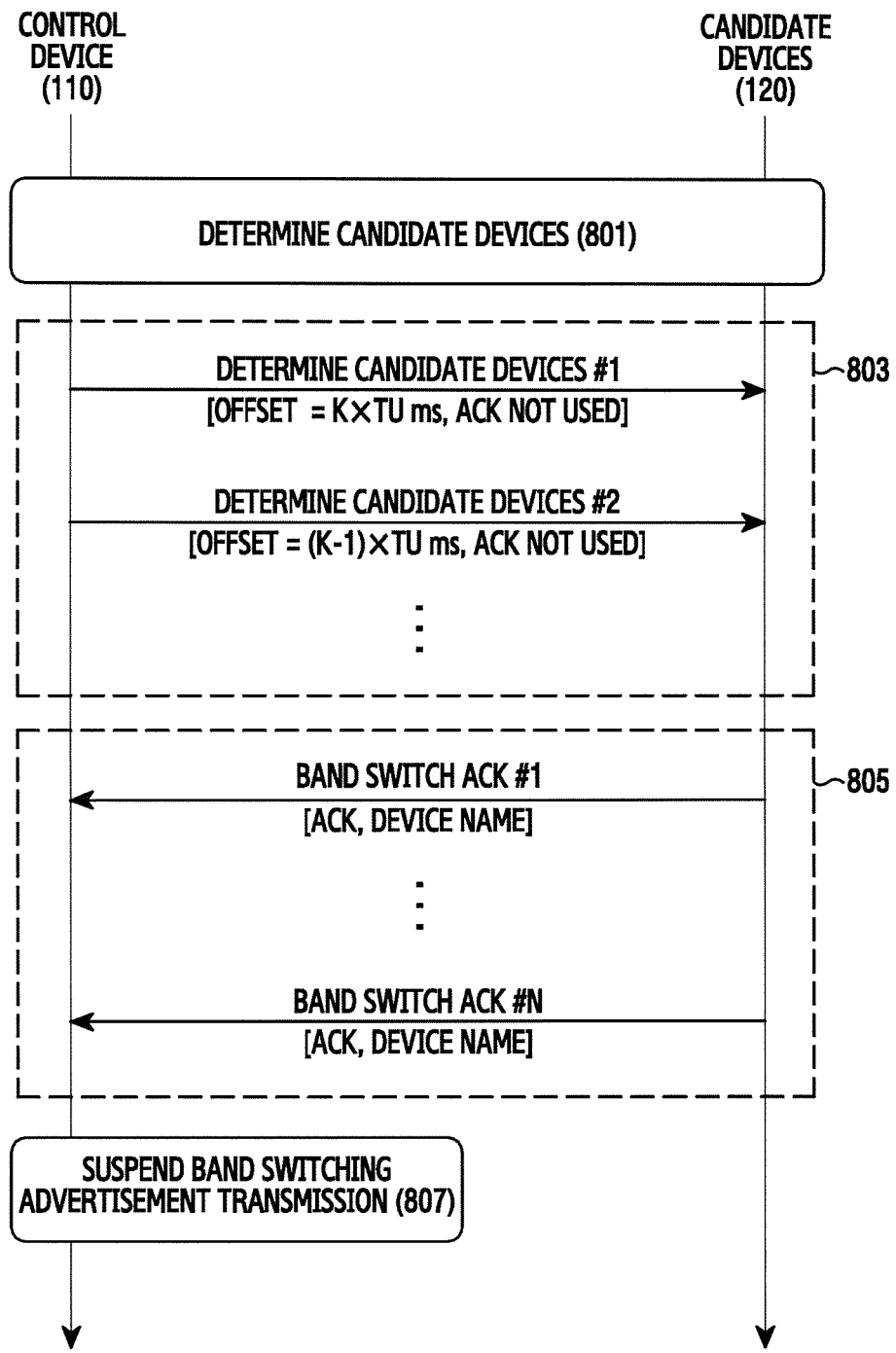
FIG. 8 illustrates discovery interval synchronization in a wireless communication system according to another embodiment of the present disclosure.

The discovery process is now described in further detail by referring to FIG. 5 and FIG. 8.

FIG. 5 depicts discovery interval synchronization in a wireless communication system according to an embodiment of the present disclosure. In FIG. 5, the ACK is not used.

Referring to FIG. 5, in operation 501, the control device 110 iteratively sends a band switching advertisement signal to the candidate devices 120. The band switching advertisement signal can include information indicating an offset. The offset indicates a start of the discovery interval of the second RAT, that is, the band switching timing. More specifically, the offset can indicate the remaining time from the band switching advertisement signal transmission time until the discovery interval starts. Since the band switching advertisement signal is transmitted at regular time intervals (e.g., 1TU), the offset reduces in every transmission. Accordingly, the candidate devices 120 can receive at least one band switching advertisement signal and thus confirm the discovery interval start time. For example, the band switching advertisement signal can include at least one of the parameters, specifically, the length 471, the type 472, the offset count 473, the TU 474, the personal identification information 475, and the service attribute 476 as shown in FIG. 4. Further, the band switching advertisement signal can further include an indicator indicating whether the ACK is used or not in response to the band switching advertisement signal.

In operation 503, the control device 110 sends a beacon signal. Before sending the beacon signal, the control device 110 can allocate a guard time. The beacon signal is used to determine connectivity using the second RAT and to determine an optimal beam. The discovery and the beamforming using the beacon signal shall be explained in detail by referring to FIG. 11 and FIG. 15.

Figure 6:
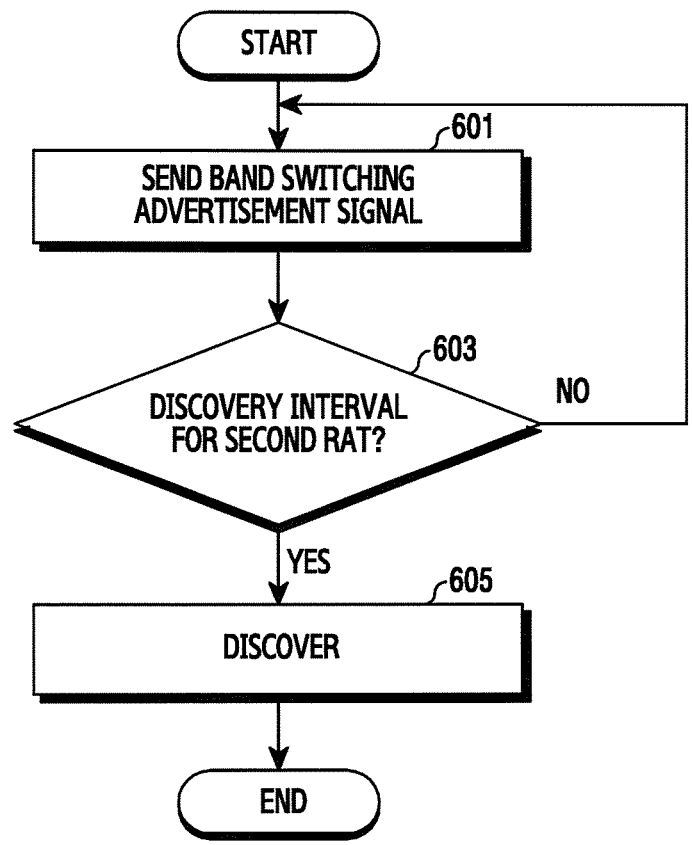
FIG. 6 illustrates a method for synchronizing a discovery interval of a device which controls link setup in a wireless communication system according to an embodiment of the present disclosure.

FIG. 6 is a flowchart of a method for synchronizing a discovery interval of a device which controls in link setup in a wireless communication system according to an embodiment of the present disclosure. FIG. 6 illustrates operations of the control device 110 for the process of FIG. 5.

Referring to FIG. 6, the control device sends a band switching advertisement signal in operation 601. The band switching advertisement signal is transmitted using a first RAT (e.g., BLE) and indicates a discovery interval start time of the second RAT (e.g., WiGig). For example, the discovery interval start time can be expressed as an absolute or relative time value. For example, the relative time value can include the remaining time from the band switching advertisement signal transmission time until the discovery interval start time. In addition, to determine whether to set the link using the second RAT, the band switching advertisement signal can further include identification information of the device.

In operation 603, the control device determines whether a discovery interval for the second RAT arrives. When the discovery interval does not arrive, the control device returns to operation 601 and repeatedly sends the band switching advertisement signal. In so doing, when the discovery interval start time of the band switching advertisement signal is represented as the relative time value, the time value decreases from a previous time value.

By contrast, when the discovery interval arrives, the control device performs the discovery for the second RAT in operation 605. The first RAT and the second RAT use different frequencies, and the coverage of the second RAT is narrower than the coverage of the first RAT. Hence, although the band switching advertisement signal is received, link setup success using the second RAT is not ensured. Thus, the control device conducts the discovery using the second RAT. For doing so, the control device can send beamformed discovery signals.

Figure 7:
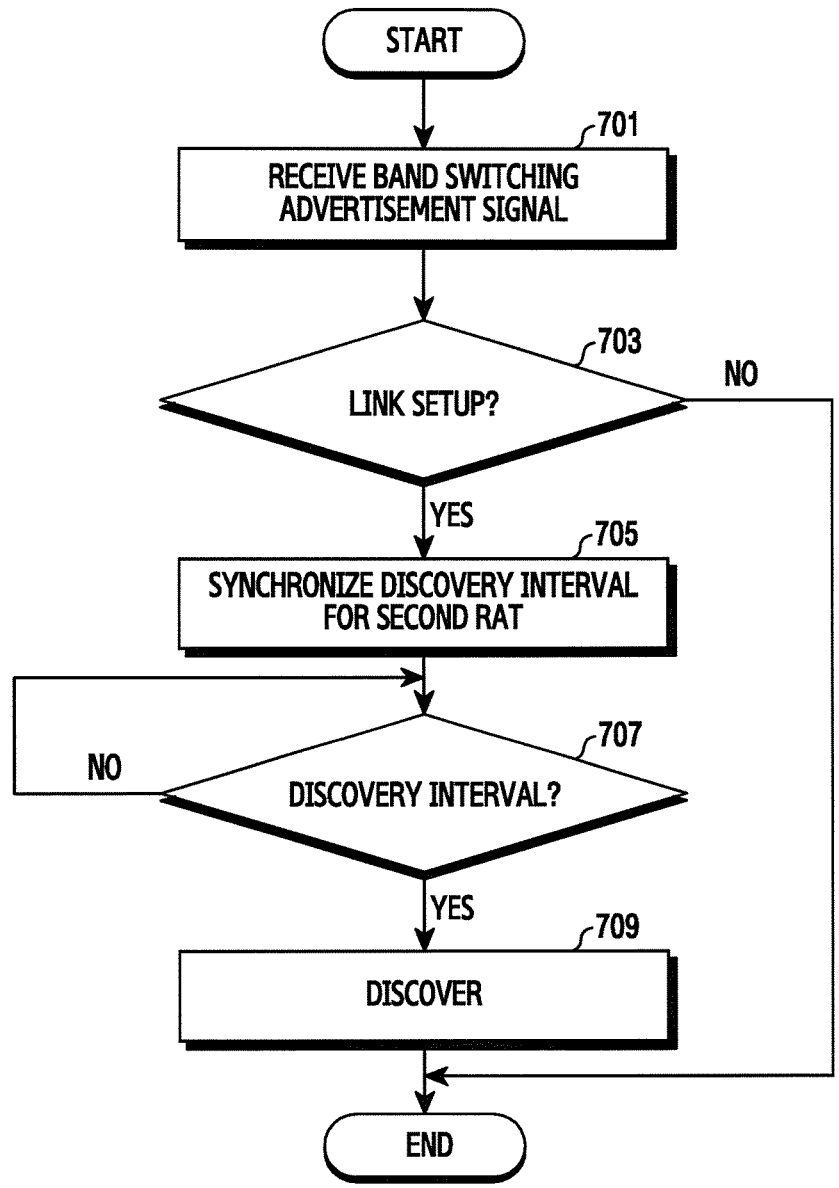
FIG. 7 illustrates a method for synchronizing a discovery interval of a device which participates in link setup in a wireless communication system according to an embodiment of the present disclosure.

FIG. 7 is a flowchart of a method for synchronizing a discovery interval of a device which participates in link setup in a wireless communication system according to an embodiment of the present disclosure. FIG. 7 illustrates operations of one of the candidate devices 120 for the process of FIG. 5.

Referring to FIG. 7, the candidate device receives a band switching advertisement signal in operation 701. The band switching advertisement signal is received using a first RAT (e.g., BLE) and indicates a discovery interval start time of a second RAT (e.g., WiGig). For example, the discovery interval start time can be expressed as an absolute or relative time value. For example, the relative time value can include the remaining time from the band switching advertisement signal transmission time until the discovery interval start time. In addition, to determine whether to set the link using the second RAT, the band switching advertisement signal can further include identification information of the control device which sends the band switching advertisement signal.

In operation 703, the candidate device determines whether to set a link. That is, the candidate device determines whether to participate in the discovery process for the second RAT. According to an embodiment of the present disclosure, the candidate device can determine whether to set the link based on the identification information of the band switching advertisement signal. More specifically, the candidate device can determine based on the identification information whether the control device is in a predefined range. For example, when the identification information is a phone number and a phone book contains the identification information, the candidate device can determine to participate in the discovery. According to another embodiment of the present disclosure, the candidate device can determine whether to set the link based on an application service to be initiated by the control device. That is, each candidate device can preset whether to allow the discovery in each application. For doing so, the control device can provide application information using the band switching advertisement signal. According to yet another embodiment of the present disclosure, the candidate device can determine whether to set the link based on proximity to the control device. In more detail, the candidate device measures signal strength with the band switching advertisement signal. When the signal strength exceeds a threshold, the candidate device can determine to participate in the discovery. According to still another embodiment of the present disclosure, the candidate device can determine whether to set the link according to a user's selection. For doing so, the candidate device can display an interface asking about data communication connectivity through a display means, and determine whether to participate in the discovery according to a user's command. According to a further embodiment of the present disclosure, the candidate device can always determine to participate in the discovery. In this case, the operation 703 can be omitted.

When determining to set the link, the candidate device synchronizes the discovery interval for the second RAT in operation 705. That is, based on the discovery interval start time information of the band switching advertisement signal, the candidate device determines the discovery interval start time. More specifically, the candidate device can set a timer value according to the remaining time from the band switching advertisement signal transmission until the discovery interval start time, and drive the timer.

In operation 707, the candidate device determines whether the discovery interval for the second RAT arrives. When using the timer for the discovery interval synchronization, the candidate device determines whether the timer expires.

When the discovery interval arrives, the device performs the discovery for the second RAT in operation 709. The first RAT and the second RAT use different frequencies, and the coverage of the second RAT is narrower than the coverage of the first RAT. Hence, although the band switching advertisement signal is received, the link setup success using the second RAT is not ensured. Thus, the candidate device conducts the discovery using the second RAT. For doing so, the candidate device can enable the communication module for the second RAT and receive the beamformed discovery signals.

FIG. 8 illustrates discovery interval synchronization in a wireless communication system according to another embodiment of the present disclosure, where the ACK is used.

Referring to FIG. 8, in operation 801, the control device 110 discovers the candidate devices 120. That is, the control device 110 determines a list of the candidate devices 120. The candidate devices 120 are devices anticipated to send an ACK, and the list of the candidate devices 120 is used to determine ACK reception completion. According to an embodiment of the present disclosure, the candidate devices 120 can be determined based on data communication records in the IB using the second RAT (e.g., WiGig). In this case, the control device 110 can determine devices participating in the IB data communication as the candidate devices 120. According to another embodiment of the present disclosure, the candidate devices 120 can be determined through the discovery in the OOB using the first RAT (e.g., BLE). In this case, the control device 110 can conduct the discovery using the first RAT and determine the discovered devices as the candidate devices 120.

In operation 803, the control device 110 iteratively sends a band switching advertisement signal to the candidate devices 120. The band switching advertisement signal can include information indicating an offset. The offset indicates a start of the discovery interval of the second RAT, that is, the band switching time. More specifically, the offset can indicate the remaining time from the band switching advertisement signal transmission time until the discovery interval start. Since the band switching advertisement signal is transmitted at regular time intervals (e.g., 1TU), the offset reduces in every transmission. Accordingly, the candidate devices 120 can confirm the discovery interval start time. For example, the band switching advertisement signal can include at least one of the parameters, specifically, the length 471, the type 472, the offset count 473, the TU 474, and the personal identification information 475 as shown in FIG. 4. Further, the band switching advertisement signal can further include an indicator indicating whether the ACK is used in response to the band switching advertisement signal.

In operation 805, the control device 110 receives ACKs from all or some of the candidate devices 120. The ACK informs the control device 110 that the band switching advertisement signal is received. The ACK can include a device name sending the ACK. For example, the device name can include an identifier used in a first RAT network or another identification information (e.g., a phone number). Upon receiving the ACK, the control device 110 can determine which one of the candidate devices 120 receives the band switching advertisement signal. In FIG. 8, the control device 110 sends the band switching advertisement signal in the operation 803 and receives the ACK in the operation 805. Notably, the ACK is not always received after the band switching advertisement signal is transmitted, and can be received during the iterative transmission of the band switching advertisement signal. For example, at least one ACK can be received after the band switching advertisement signal #1 is transmitted and before the band switching advertisement signal #2 is transmitted. That is, the operation 803 and the operation 805 can be executed at the same time.

In operation 807, the control device 110 suspends the band switching advertisement transmission. It is assumed that the ACKs are received from all of the candidate devices 120 in the operation 805. Using the device name of the ACK, the control device 110 can determine whether the ACK is received from each of the candidate devices 120 of the candidate device list. When receiving the ACKs from all of the candidate devices 120, the control device 110 determines that there is no need to transmit the band switching advertisement signal any more. The control device 110 suspends the band switching advertisement transmission, thus preventing unnecessary power and resource waste.

Figure 9:
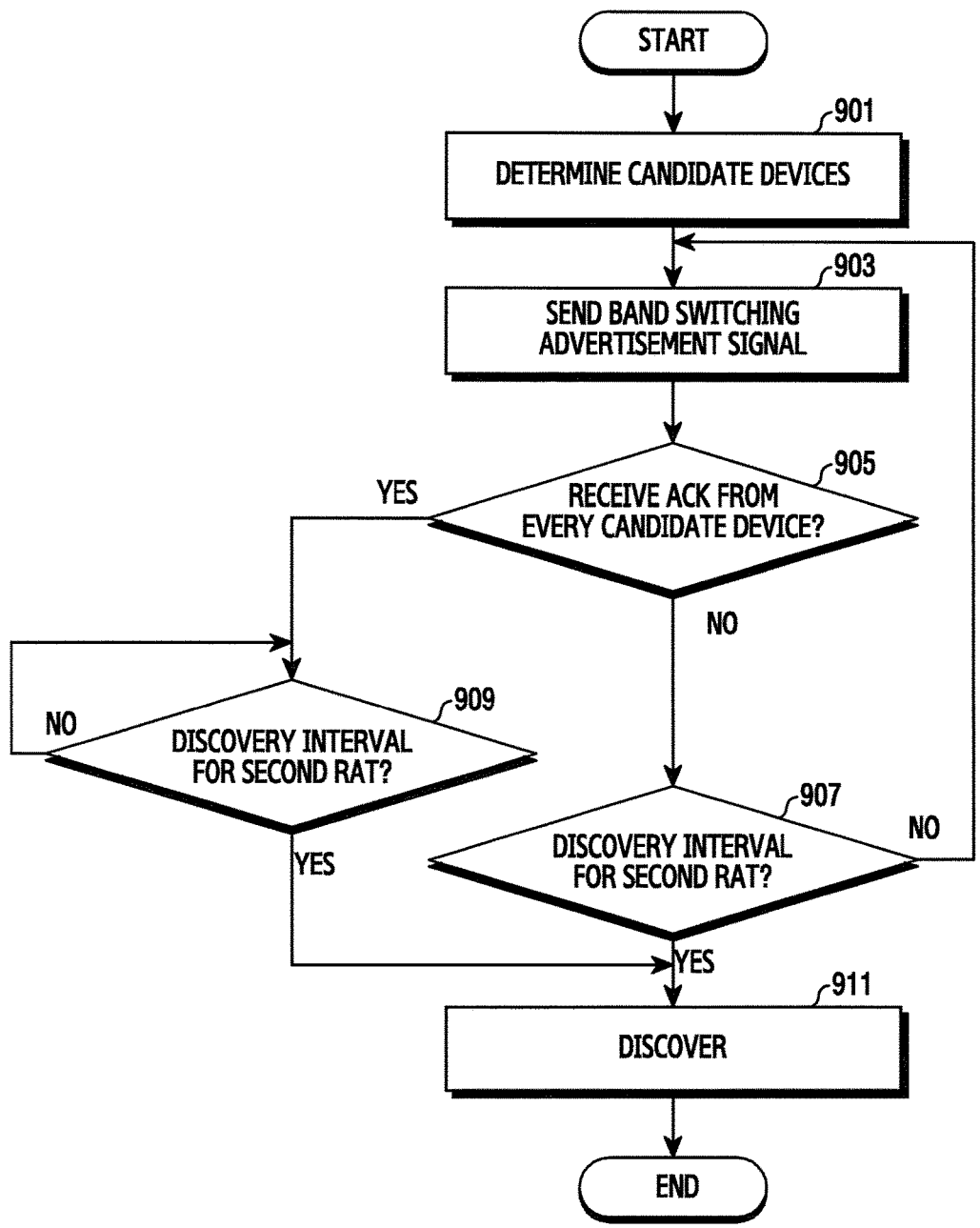
FIG. 9 illustrates a method for synchronizing a discovery interval of a device which controls link setup in a wireless communication system according to another embodiment of the present disclosure.

FIG. 9 is a flowchart of a method for synchronizing a discovery interval of a control device which controls in link setup in a wireless communication system according to another embodiment of the present disclosure. FIG. 9 illustrates operations of the control device 110 for the process of FIG. 8.

Referring to FIG. 9, the control device determines candidate devices in operation 901. The candidate devices are candidates anticipated to send the ACK, and a list of the candidate devices is used to determine ACK reception completion. According to an embodiment of the present disclosure, the control device can determine devices participating in the D3 data communication using the second RAT (e.g., WiGig), as the candidate devices. According to another embodiment of the present disclosure, the control device can perform the discover process using the first RAT (e.g., BLE) and determine the discovered devices as the candidate devices.

In operation 903, the control device sends a band switching advertisement signal. The band switching advertisement signal is transmitted using the first RAT and indicates a discovery interval start time of the second RAT. For example, the discovery interval start time can be expressed as an absolute or relative time value. For example, the relative time value can include the remaining time from the band switching advertisement signal transmission time until the discovery interval start time. In addition, to determine whether to set the link using the second RAT, the band switching advertisement signal can further include identification information of the device.

In operation 905, the control device determines whether ACKs are received from all of the candidate devices. The control device receives the ACK of the band switching advertisement signal, and the ACK includes a device name of the candidate device sending the ACK. Hence, the control device can determine whether ACKs are received from all of the candidate devices by comparing the candidate device list with the device name of the ACK.

When not receiving the ACKs from all of the candidate devices, the control device determines whether the discovery interval for the second RAT arrives in operation 907. When the discovery interval does not arrive, the control device returns to operation 903 and iteratively sends the band switching advertisement signal. In so doing, when the discovery interval start time is a relatively time value in the band switching advertisement signal, the time value decreases from the previous transmission.

When receiving the ACKs from all of the candidate devices, the control device determines whether the discovery interval for the second RAT arrives in operation 909. Unlike the operation 907, although the discovery interval does not arrive, the control device does not return to operation 903 but stands by.

In operation 911, the control device performs the discovery for the second RAT. The first RAT and the second RAT use different frequencies, and the coverage of the second RAT is narrower than the coverage of the first RAT. Hence, although the band switching advertisement signal is received, the link setup success using the second RAT is not ensured. Thus, the candidate device conducts the discovery using the second RAT. For doing so, the candidate device can transmit beamformed discovery signals.

Figure 10:
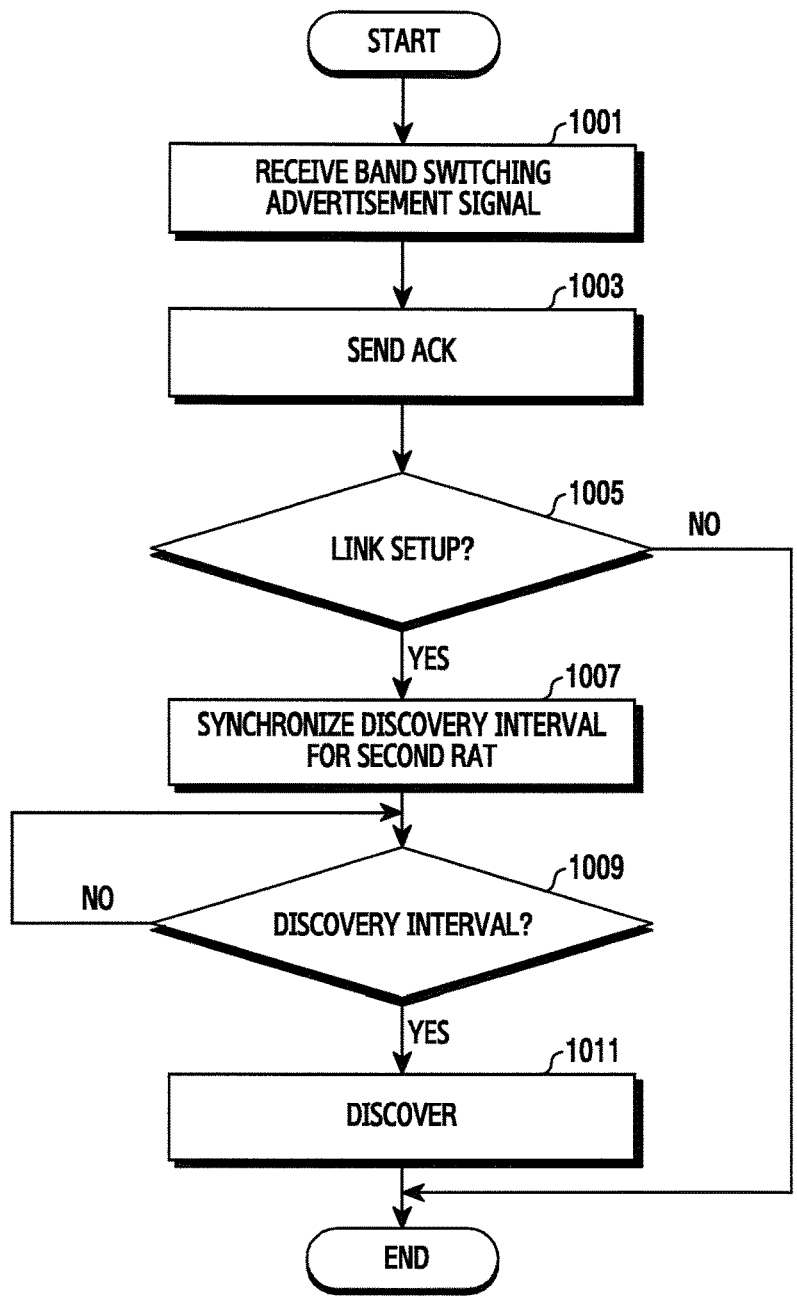
FIG. 10 illustrates a method for synchronizing a discovery interval of a device which participates in link setup in a wireless communication system according to another embodiment of the present disclosure.

FIG. 10 is a flowchart of a method for synchronizing a discovery interval of a candidate device which participates in link setup in a wireless communication system according to another embodiment of the present disclosure. FIG. 10 illustrates operations of one of the candidate devices 120 for the process of FIG. 8.

Referring to FIG. 10, the candidate device receives a band switching advertisement signal in operation 1001. The band switching advertisement signal is received using a first RAT (e.g., BLE) and indicates a discovery interval start time of a second RAT (e.g., WiGig). For example, the discovery interval start time can be expressed as an absolute or relative time value. For example, the relative time value can include the remaining time from the band switching advertisement signal transmission time until the discovery interval start time. In addition, to determine whether to set the link using the second RAT, the band switching advertisement signal can further include identification information of a control device which sends the band switching advertisement signal.

In operation 1003, the candidate device sends an ACK. The ACK informs the control device that the band switching advertisement signal is received. The ACK can include a name of the candidate device. For example, the name can include an identifier used in the first RAT network or another identification information (e.g., a phone number).

In operation 1005, the candidate device determines whether to set a link. That is, the candidate device determines whether to participate in the discovery process for the second RAT. According to an embodiment of the present disclosure, the candidate device can determine whether to set the link based on the identification information of the band switching advertisement signal. More specifically, the candidate device can determine based on the identification information whether the control device is in a predefined range. For example, when the identification information is a phone number and a phone book contains the identification information, the candidate device can determine to participate in the discovery. According to another embodiment of the present disclosure, the candidate device can determine whether to set the link based on proximity to the control device. In more detail, the candidate device measures signal strength with the band switching advertisement signal. When the signal strength exceeds a threshold, the candidate device can determine to participate in the discovery. According to yet another embodiment of the present disclosure, the candidate device can determine whether to set the link based on a user's selection. For doing so, the candidate device can display an interface asking about data communication connectivity through a display means, and determine whether to participate in the discovery according to a user's command. According to still another embodiment of the present disclosure, the candidate device can always determine to participate in the discovery. In this case, the operation 1005 can be skipped.

When determining to set the link, the candidate device synchronizes the discovery interval for the second RAT in operation 1007. That is, based on the discovery interval start time information of the band switching advertisement signal, the candidate device determines the discovery interval start time. More specifically, the candidate device can set a timer value according to the remaining time from the band switching advertisement signal transmission until the discovery interval start time, and drive the timer.

In operation 1009, the candidate device determines whether the discovery interval for the second RAT arrives. When using the timer for the discovery interval synchronization, the candidate device determines whether the timer expires.

When the discovery interval arrives, the device performs the discovery for the second RAT in operation 1011. The first RAT and the second RAT use different frequencies, and the coverage of the second RAT is narrower than the coverage of the first RAT. Hence, although the band switching advertisement signal is received, the link setup success using the second RAT is not ensured. Thus, the candidate device conducts the discovery using the second RAT. For doing so, the candidate device can enable the communication module for the second RAT and receive the beamformed discovery signals.

As such, the devices enable the data communication module at a particular time and operate in a discovery mode.

When the discovery interval is not synchronized, the control device which conducts the beamforming performs Sector Sweep (SS) on a beacon frame in all directions, and then the candidate devices 120 sequentially perform the SS on a Sector Sweep (SSW) frame in a reverse direction. In so doing, the devices receiving the frame set a receive (RX) beam direction to an omni direction or a quasi-omni direction, select a beam sector of best reception quality, and notify the selected beam sector to a counterpart device. Since a plurality of devices compete for the SS of the SSW frame, concurrent attempts can cause a collision. Hence, unexpected time delay and energy consumption can arise.

However, the present discovery interval synchronization can achieve more efficient beamforming, that is, beam training. The present devices synchronize the discovery interval using the band switching broadcasting signal through the auxiliary communication module. Likewise, when the control device which conducts the beamforming performs the SS on beacon frames in the omni direction, all of the candidate devices 120 concurrently receive the beacon frames. Next, the control device iteratively sends the beacon frame in the omni direction or the quasi-omni direction. In so doing, the candidate devices 120 receive the beacon frames by sector-sweeping the RX beam and select a beam sector of best signal quality. In this case, merely two SSs can finish the concurrent beamforming of the candidate devices 120.

Such a discovery process based on the synchronization can be far more advantageous in a direct connection between devices. In the discovery process without the synchronization, the control device which forms the beam and the candidate devices 120 each perform the transmit (TX) beam training and thus an optimal beam for the omni-directional communication is not selected. However, in the discovery process based on the synchronization, the control device performs the TX beam training and the candidate devices 120 conduct the RX beam training, thus selecting an optimal beam for content delivery from the control device to the candidate devices 120. Typically, in content sharing between devices, a device initiating the connection has contents and forms the beam. Hence, in most cases, an optimal beam can be selected. Such a discovery process based on the synchronization can be fulfilled as shown in FIG. 11.

Figure 11:
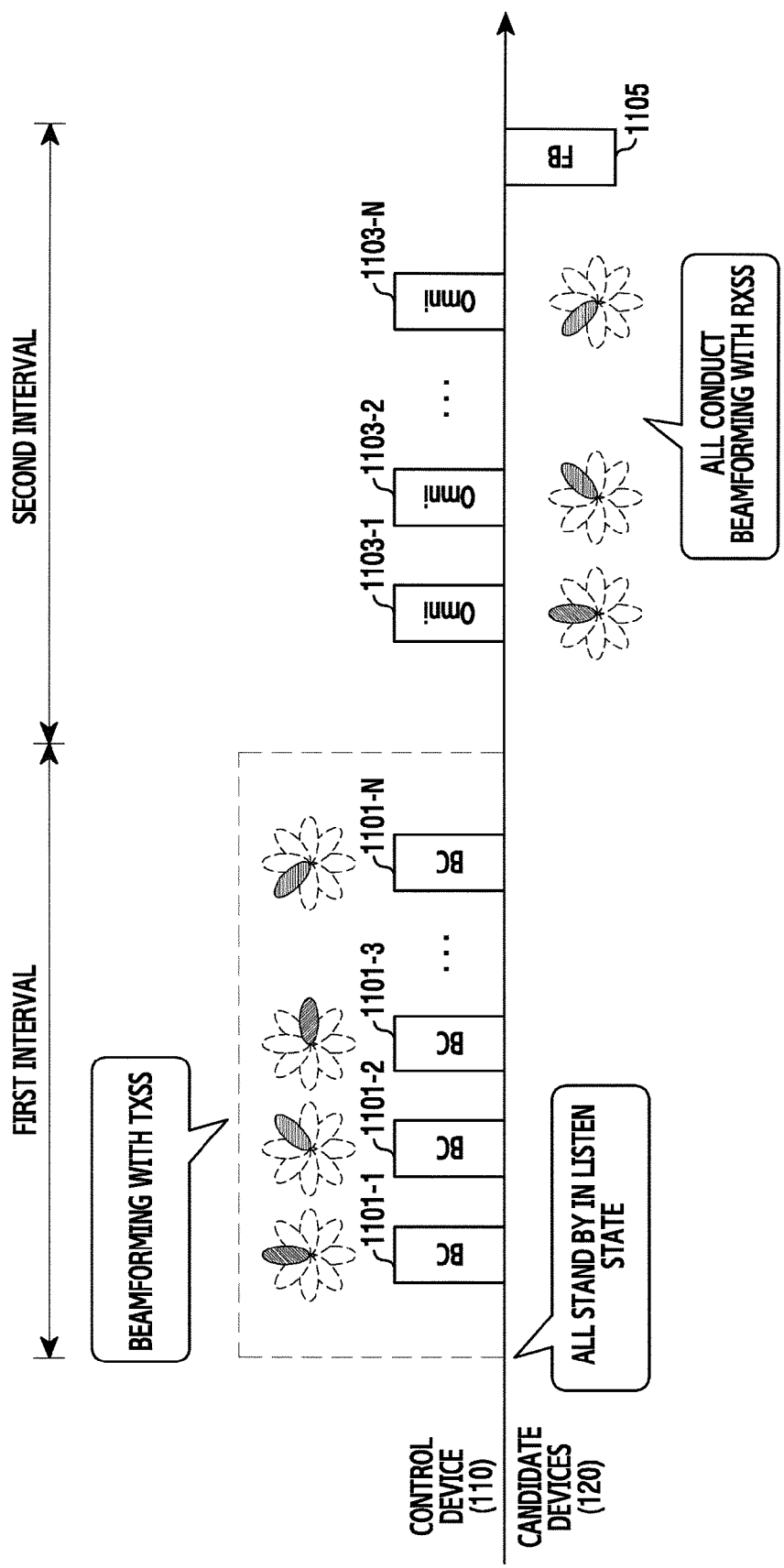
FIG. 11 illustrates beam training of a discovery interval in a wireless communication system according to an embodiment of the present disclosure.

FIG. 11 is a flowchart of beam training of a discovery interval in a wireless communication system according to an embodiment of the present disclosure. In FIG. 11, a control device, that is, the control device 110 finishes the beam training through two SSs.

Referring to FIG. 11, during a first interval, the control device 110 performs TXSS. That is, the control device 110 beamforms beacon signals in supportable beam directions and sequentially sends the beamformed beacon signals 1101-1 through 1101-N. In so doing, all of the candidate devices 120 stand by in a listen state. That is, the candidate devices 120 try to detect the beamformed beacon signals 1101-1 through 1101-N. The candidate devices 120 receive the beacon signals 1101-1 through 1101-N over an omni-directional RX beam without the RX beamforming. Accordingly, the candidate devices 120 each can determine an optimal TX beam. Notably, based on the coverage of the second RAT, some of the candidate devices 120 may not detect all of the beacon signals 1101-1 through 1101-N.

During a second interval, the control device 110 sequentially transmits beacon signals 1103-1 through 1103-N over an omni-directional beam. In so doing, the candidate devices 120 perform the RX beamforming. That is, the candidate devices 120 conduct the RXSS. Hence, the candidate devices 120 each can determine an optimal RX beam. Notably, based on the coverage of the second RAT, some of the candidate devices 120 may not detect all of the beacon signals 1103-1 through 1103-N.

Next, the candidate devices 120 each send feedback information notifying the optimal TX beam and the optimal RX beam. Yet, some of the candidate devices 120, some not detecting the beacon signals 1101-1 through 1101-N, do not transmit the feedback information. The feedback information can include at least one of information indicating the optimal TX beam, information indicating the optimal RX beam, and channel quality of a combination of the optimal TX beam and the optimal RX beam. Hence, the control device 110 can determine whether to set the link with the candidate devices 120 using the second RAT. For example, the control device 110 can determine to set the link with the candidate device which sends the feedback information. Alternatively, the control device 110 can determine to set the link with the candidate device which reports the channel quality over a threshold.

Figure 12:
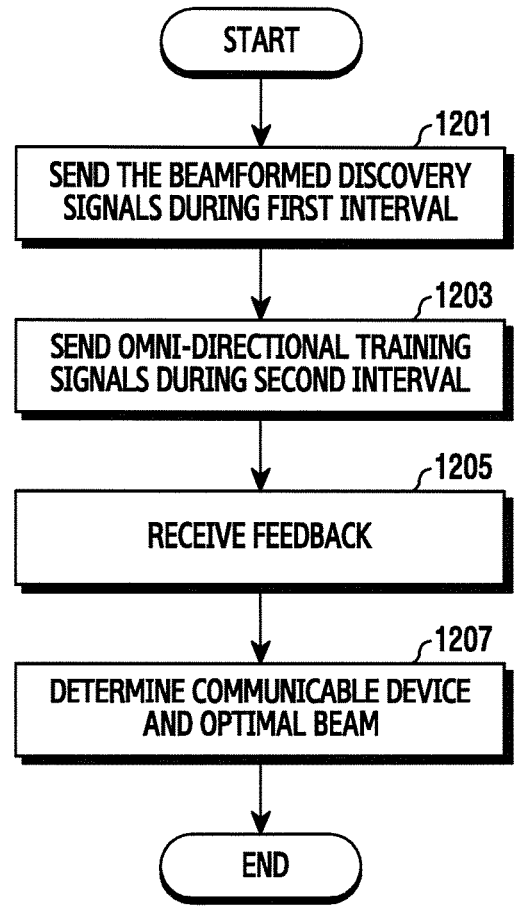
FIG. 12 illustrates a beam training method of a control device in a wireless communication system according to an embodiment of the present disclosure.

FIG. 12 is a flowchart of a beam training method of a control device in a wireless communication system according to an embodiment of the present disclosure. FIG. 12 illustrates operations of the control device 110 for the process of FIG. 11.

Referring to FIG. 12, in operation 1201, the control device transmits beamformed discovery signals in a first interval. The discovery signal can be referred to as a beacon frame. The discovery signal can include at least one of a timestamp, a beacon interval, capability information of the control device, and a service set identifier.

In operation 1203, the control device sends omni-directional training signals during a second interval. That is, the control device sends the training signals not beamformed, that is, over the omni-directional beam. The training signal can be constructed identically to or differently from the discovery signal.

In operation 1205, the control device receives feedback. The feedback can be received from at least one of the candidate devices receiving a band switching advertisement signal using the first RAT. That is, the feedback is received from at least one of the candidate devices, which detects the discovery signal and the training signal. The feedback can include at least one of information indicating an optimal TX beam of a corresponding device, information indicating an optimal RX beam of the corresponding device, and channel quality of a combination of the optimal TX beam and the optimal RX beam. Herein, the feedback can be received using the first RAT or the second RAT.

In operation 1207, the control device determines a communicable device and an optimal beam. That is, the control device can determine whether to set the link with the candidate devices using the second RAT. For example, the control device can determine to set the link with the candidate device which sends the feedback information. Alternatively, the control device can determine to set the link with the candidate device which reports the channel quality over a threshold.

In FIG. 12, the control device transmits the discovery signals and the training signals in the operation 1201 and the operation 1203. According to another embodiment of the present disclosure, the control device can dynamically transmit the discovery/training signal based on signal strength of the second RAT or the service attribute 476 of FIG. 4. For example, when the signal strength of the second RAT is high or exceeds a predefined threshold, the control device can relatively widen a beamwidth and reduce the number of sectors. In this case, the time taken for the beam training and the power consumption of the control device can reduce. When a plurality of signal values is measured in relation to the first RAT, the control device can adjust the beamwidth based on the smallest signal value. For example, when the service attribute 476 requires a high transfer rate, the control device can relatively narrow the beamwidth to enhance the signal quality and sweep a plurality of beam sectors. By contrast, when the service requires a high security level, the control device can relatively widen the beamwidth to narrow the signal propagation range and sweep a relatively small number of beam sectors. When the beamwidth is adjustable, information about at least one of the beamwidth and the number of the beam sectors can be contained in the discovery/training signal transmitted in the operation 1201.

Figure 13:
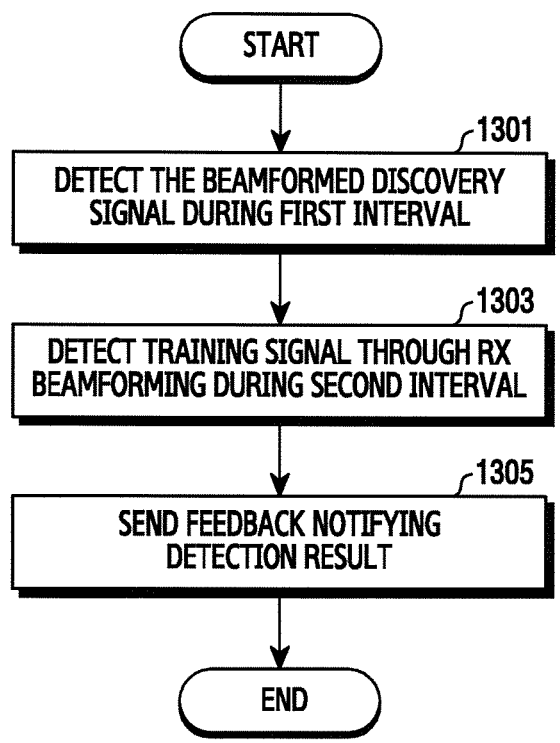
FIG. 13 illustrates a beam training method of a candidate device in a wireless communication system according to an embodiment of the present disclosure.

FIG. 13 is a flowchart of a beam training method of a candidate device in a wireless communication system according to an embodiment of the present disclosure. FIG. 13 illustrates operations of one of the candidate devices 120 for the process of FIG. 11.

Referring to FIG. 13, in operation 1301, the candidate device detects a beamformed discovery signal during the first interval. In the first interval, the control device sequentially transmits the discovery signals beamformed in different directions. The candidate device tries to detect the discovery signal without RS beamforming and thus detects at least one discovery signal. The beam direction of the at least one discovery signal detected is an optimal TX beam for the candidate device. The discovery signal can be referred to as a beacon frame. The discovery signal can include at least one of a timestamp, a beacon interval, capability information of the control device, and a service set identifier.

In operation 1303, the candidate device detects a training signal through the RX beamforming during the second interval. In the second interval, the control device iteratively transmits the training signals not beamformed, that is, over an omni-directional beam. The candidate device tries to detect the training signal over RX beams of different directions, and thus detects at least one training signal. The beam direction of the at least one discovery signal detected is an optimal RX beam for the candidate device.

In operation 1305, the candidate device sends feedback. The feedback can include at least one of information indicating the optimal TX beam, information indicating the optimal RX beam, and channel quality of a combination of the optimal TX beam and the optimal RX beam.

In FIG. 13, the candidate device receives the discovery/training signals in the operation 1301 and the operation 1303. According to another embodiment of the present disclosure, the control device can adjust the beamwidth of the discovery/training signals. That is, when the control device dynamically operates the beam training, the candidate device can receive information about at least one of the beamwidth and the number of the beam sectors in operation 1201 and adaptively conduct the beam training according to the received information.

In FIGS. 11, 12, and 13, the control device determines the optimal TX beam and the candidate device determines the optimal RX beam. Accordingly, an optimized radio link can be attained for the data transmission of the control device and the data reception of the candidate device. Conversely, when the candidate device transmits data to the control device, reciprocity is generally established. Hence, the RX beam of the candidate device can be used as the TX beam and the TX beam of the control device can be used as the RX beam. However, when the reciprocity is not established, the RX beam cannot be used as the TX beam and vice versa. In this case, when one or more of the candidate devices are selected for the data sharing, the control device and the selected device can perform reverse beam training. For example, the reverse beam training can be fulfilled as shown in FIG. 14.

Figure 14:
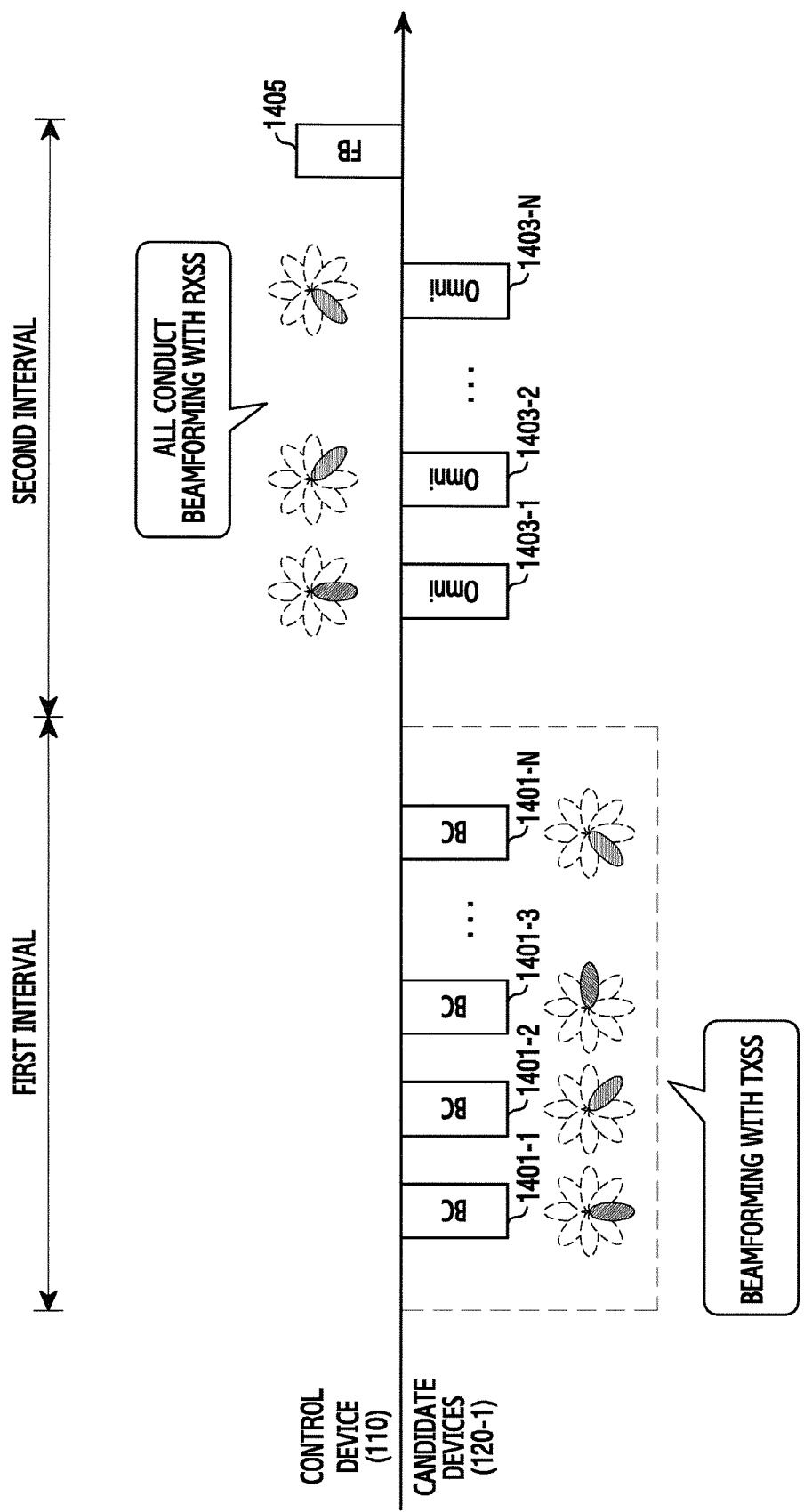
FIG. 14 illustrates reverse beam training in a wireless communication system according to an embodiment of the present disclosure.

FIG. 14 depicts reverse beam training in a wireless communication system according to an embodiment of the present disclosure. FIG. 14 depicts the reverse beam training between the control device 110 and the candidate device 120-1. When a plurality of candidate devices is selected, the process of FIG. 14 can be iteratively applied to the candidate devices.

Referring to FIG. 14, during a first interval, the candidate device 120-1 performs TXSS. That is, the candidate device 120-1 beamforms beacon signals in supportable beam directions and sequentially transmits the beamformed beacon signals 1401-1 through 1401-N. In so doing, the control device 110 stands by in a listen state. That is, the control device 110 tries to detect the beamformed beacon signals 1401-1 through 1401-N. The control device 110 receives the beacon signals 1401-1 through 1401-N over an omni-directional RX beam without RX beamforming. Hence, the control device 110 can determine an optimal TX beam of a reverse link. Yet, depending on the coverage of the second RAT, the control device 110 may not detect all of the beacon signals 1401-1 through 1401-N. During a second interval, the candidate device 120-1 sequentially sends beacon signals 1403-1 through 1403-N in sequence over an omni-directional beam. In so doing, the control device 110 performs RX beamforming. That is, the control device 110 conducts RXSS. Thus, the control device 110 can determine an optimal RX beam of the reverse link. Next, the control device 110 sends feedback information notifying the optimal TX beam and the optimal RX beam. The feedback information can include at least one of information indicating the optimal TX beam, information indicating the optimal RX beam, and channel quality of a combination of the optimal TX beam and the optimal RX beam.

In FIGS. 11, 12, and 13, the control device 110 conducts the SS twice. According to another embodiment of the present disclosure, the discovery can be carried out such that the control device 110 conducts the SS once and the candidate devices 120 each perform the SS. In this case, the devices can control collisions by scheduling SS intervals of the candidate devices 120 in advance using the auxiliary communication module. The discovery including the scheduling is now explained in FIG. 15.

Figure 15:
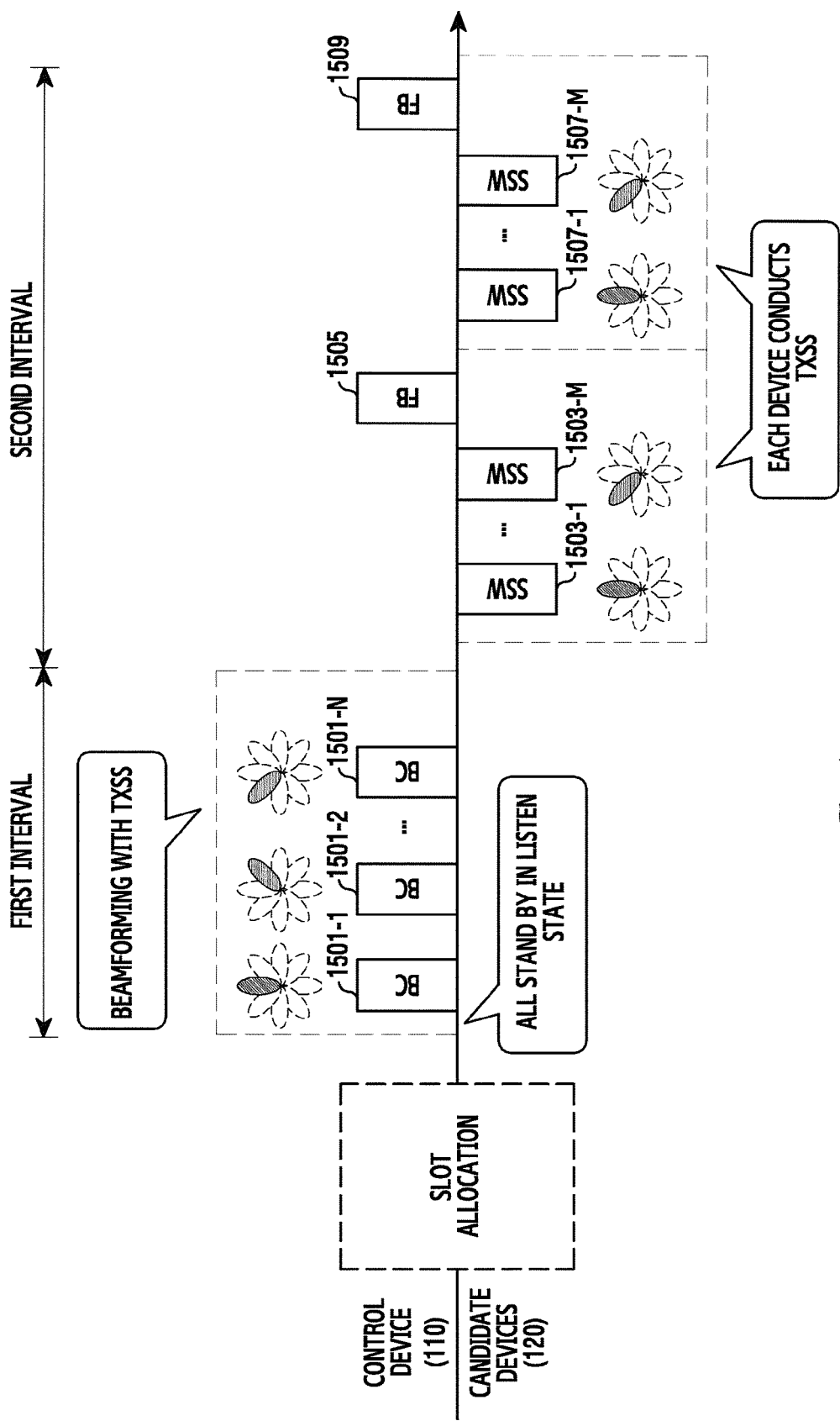
FIG. 15 illustrates beam training of a discovery interval in a wireless communication system according to another embodiment of the present disclosure.

FIG. 15 depicts beam training of a discovery interval in a wireless communication system according to another embodiment of the present disclosure. In FIG. 15, the beam training is completed through SS of a control device, that is, the control device 110 and scheduled SS of candidate devices 120, that is, the candidate devices 120.

Referring to FIG. 15, the control device 110 and the candidate devices 120 perform slot allocation. For example, the control device 110 allocates slots of a second interval to the candidate devices 120. The control device 110 notifies a slot allocation result to the candidate devices 120. The slot allocation result can be delivered by a broadcasting signal. The control device 110 can transmit the slot allocation result using the first RAT. The slot allocation can be referred to as a band enabling negotiation phase.

Next, the control device 110 conducts TXSS during the first interval. That is, the control device 110 beamforms beacon signals in supportable beam directions and transmits the beamformed beacon signals 1501-1 through 1501-N in sequence. The candidate devices 120 all stand by in a listen state. That is, the candidate devices 120 try to detect the beamformed beacon signals 1501-1 through 1501-N. In so doing, the candidate devices 120 receive the beacon signals 1501-1 through 1501-N over an omni-directional RX beam without RX beamforming. Hence, the candidate devices 120 each can determine an optimal TX beam. Although not depicted in FIG. 15, the candidate devices 120 each can feed information notifying the optimal TX beam back. Yet, depending on the coverage of the second RAT, some of the candidate devices 120 may not detect all of the beacon signals 1501-1 through 1501-N.

During a second interval, the candidate devices 120 each perform TXSS in their allocated slot. The control device 110 receives training signals from the candidate devices 120 over an omni-directional RX beam without RX beamforming, and then sends feedback information to the corresponding candidate device at a back end of each slot. Herein, the feedback information can be transmitted without being beamformed, that is, over an omni-directional beam. More specifically, a first candidate device beamforms training signals in supportable beam directions and sequentially transmits the beamformed training signals 1503-1 through 1503-M, and the control device 110 sends feedback information 1505 to the first candidate device. A second candidate device beamforms training signals in supportable beam directions and sequentially transmits the beamformed training signals 1507-1 through 1507-M, and the control device 110 sends feedback information 1509 to the second candidate device. The feedback information 1505 and the feedback information 1509 include information notifying an optimal beam determined by the control device 110. Since similarity of the TX beam and the RX beam is recognized based on channel reciprocity, the candidate devices 120 each can determine the optimal RX beam based on the feedback information.

Figure 16:
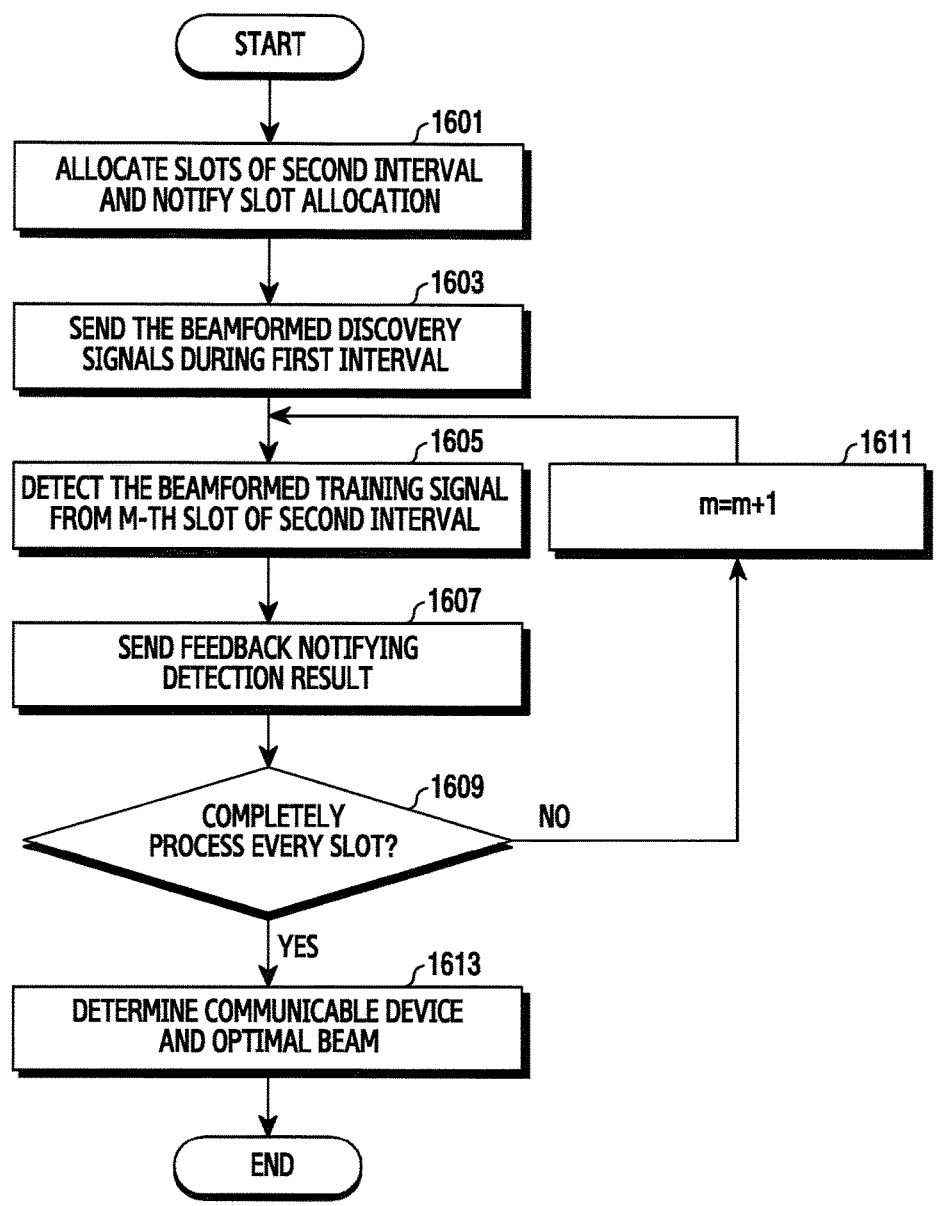
FIG. 16 illustrates a beam training method of a control device in a wireless communication system according to another embodiment of the present disclosure.

FIG. 16 is a flowchart of a beam training method of a control device in a wireless communication system according to another embodiment of the present disclosure. FIG. 16 illustrates operations of the control device 110 for the process of FIG. 15.

Referring to FIG. 16, the control device allocates slots of a second interval of a discovery interval to candidate devices and notifies a slot allocation result in operation 1601. The control device can send the slot allocation information using a broadcasting signal. The slot is a segmented resource unit of the second interval on a time axis, and one slot occupies a resource for delivering a plurality of training signals and feedback information. The slot allocation result can be notified using combinations of a slot number and a device name. The control device can transmit the slot allocation result using a first RAT (e.g., BLE).

In operation 1603, the control device sends beamformed discovery signals during a first interval. The discovery signal can be referred to as a beacon frame. The discovery signal can include at least one of a timestamp, a beacon interval, capability information of the control device, and a service set identifier.

In operation 1605, the control device detects a beamformed training signal in an m-th slot of the second interval. During the m-th slot, one of the candidate devices iteratively sends training signals beamformed. Herein, m is initially 1. The control device tries to detect the training signal without RX beamforming and thus detects at least one training signal. A beam direction applied to the at least one training signal detected is an optimal RX beam of the candidate device. In addition, the control device can measure channel quality.

In operation 1607, the control device sends feedback. The feedback can include information indicating the optimal RX beam. That is, the control device notifies the optimal RX beam identified in the operation 1605, to the corresponding candidate device. The control device can send the feedback without beamforming, that is, using an omni-directional beam. Alternatively, the control device can send the feedback over an optimal TX beam of the corresponding candidate device.

In operation 1609, the control device determines whether all of the slots are completely processed. That is, the control device determines whether the training signal is detected in all of the slots allocated in the operation 1601. When not completely processing all of the slots, the control device increases m by one in operation 1611 and then returns to the operation 1605.

By contrast, when completely processing all of the slots, the control device determines a communicable device and an optimal beam in operation 1613. That is, the control device can determine whether to set a link with the candidate devices using a second RAT (e.g., WiGig). For example, the control device can determine to set the link with the candidate device which sends the training signal detected in the operation 1605. Alternatively, the control device can determine to set the link with the candidate device of the channel quality over a threshold.

Figure 17:
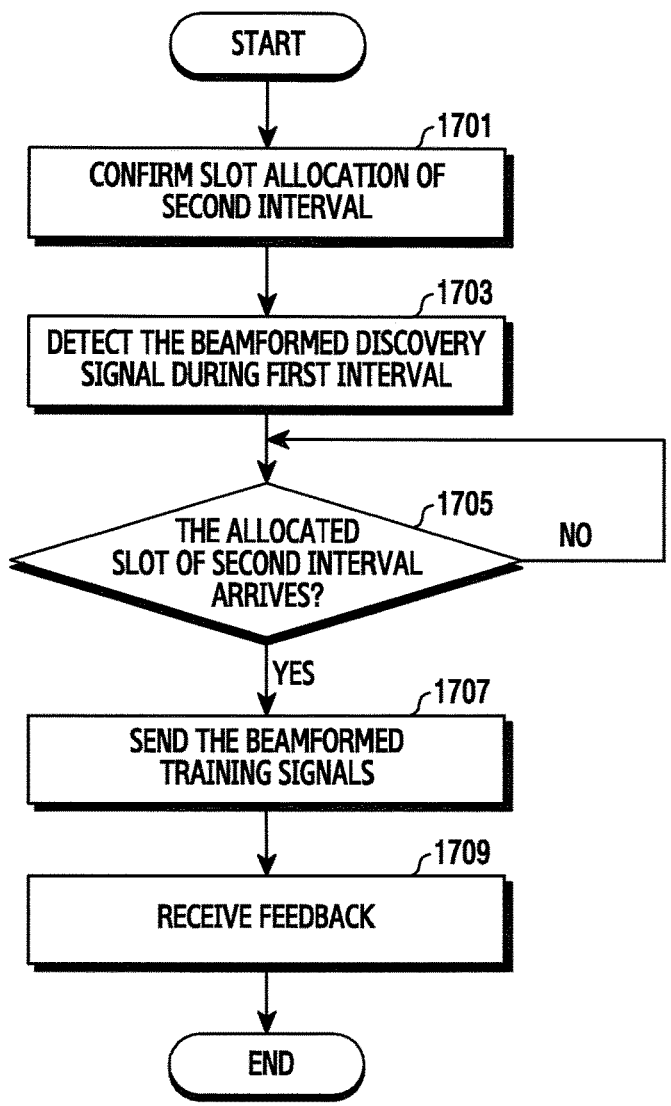
FIG. 17 illustrates a beam training method of a candidate device in a wireless communication system according to another embodiment of the present disclosure.

FIG. 17 is a flowchart of a beam training method of a candidate device in a wireless communication system according to another embodiment of the present disclosure. FIG. 17 illustrates operations of one of the candidate devices 120 for the process of FIG. 15.

Referring to FIG. 17, the candidate device confirms allocation of slots of a second interval of a discovery interval in operation 1701. That is, the candidate device receives a slot allocation result from a control device. The slot is a segmented resource unit of the second interval on a time axis, and one slot occupies a resource for delivering a plurality of training signals and feedback information. The slot allocation result can be notified using combinations of a slot number and a device name. The candidate device can receive the slot allocation result using a first RAT (e.g., BLE).

In operation 1703, the candidate device detects a beamformed discovery signal during a first interval. During the first interval, the control device sequentially transmits the beamformed training signals in different directions. The candidate device tries to detect the discovery signal without RX beamforming and detects at least one discovery signal. A beam direction applied to the at least one training signal detected is an optimal TX beam of the candidate device. The discovery signal can be referred to as a beacon frame. The discovery signal can include at least one of a timestamp, a beacon interval, capability information of the control device, and a service set identifier. In addition, the candidate device can send feedback notifying the optimal TX beam to the control device.

In operation 1705, the candidate device determines whether its allocated slot arrives in the second interval. That is, the candidate device is allocated one of the slots of the second interval. Hence, the candidate device may not perform the discovery in a slot allocated to other candidate device.

When the allocated slot comes, the candidate device transmits beamformed training signals during the allocated slot in operation 1707. That is, the candidate device beamforms the training signals in supportable beam directions and sends the beamformed training signals in sequence.

In operation 1709, the candidate device receives feedback from the control device. The feedback can include information indicating an optimal RX beam for the candidate device determined by the control device. The candidate device can receive the feedback without beamforming, that is, over an omni-directional beam.

In FIGS. 15, 16, and 17, the control device determines the optimal TX beam and the optimal RX beam. Accordingly, an optimized radio link can be attained for the data transmission of the control device and the data reception of the candidate device. Conversely, when the candidate device transmits data to the control device, reciprocity is generally established. Hence, the RX beam of the candidate device can be used as the TX beam and the TX beam of the control device can be used as the RX beam. However, when the reciprocity is not established, the RX beam cannot be used as the TX beam and vice versa. In this case, when one or more of the candidate devices are selected for data sharing, the control device and the selected device can perform reverse beam training. For example, the reverse beam training can be fulfilled as shown in FIG. 18.

Figure 18:
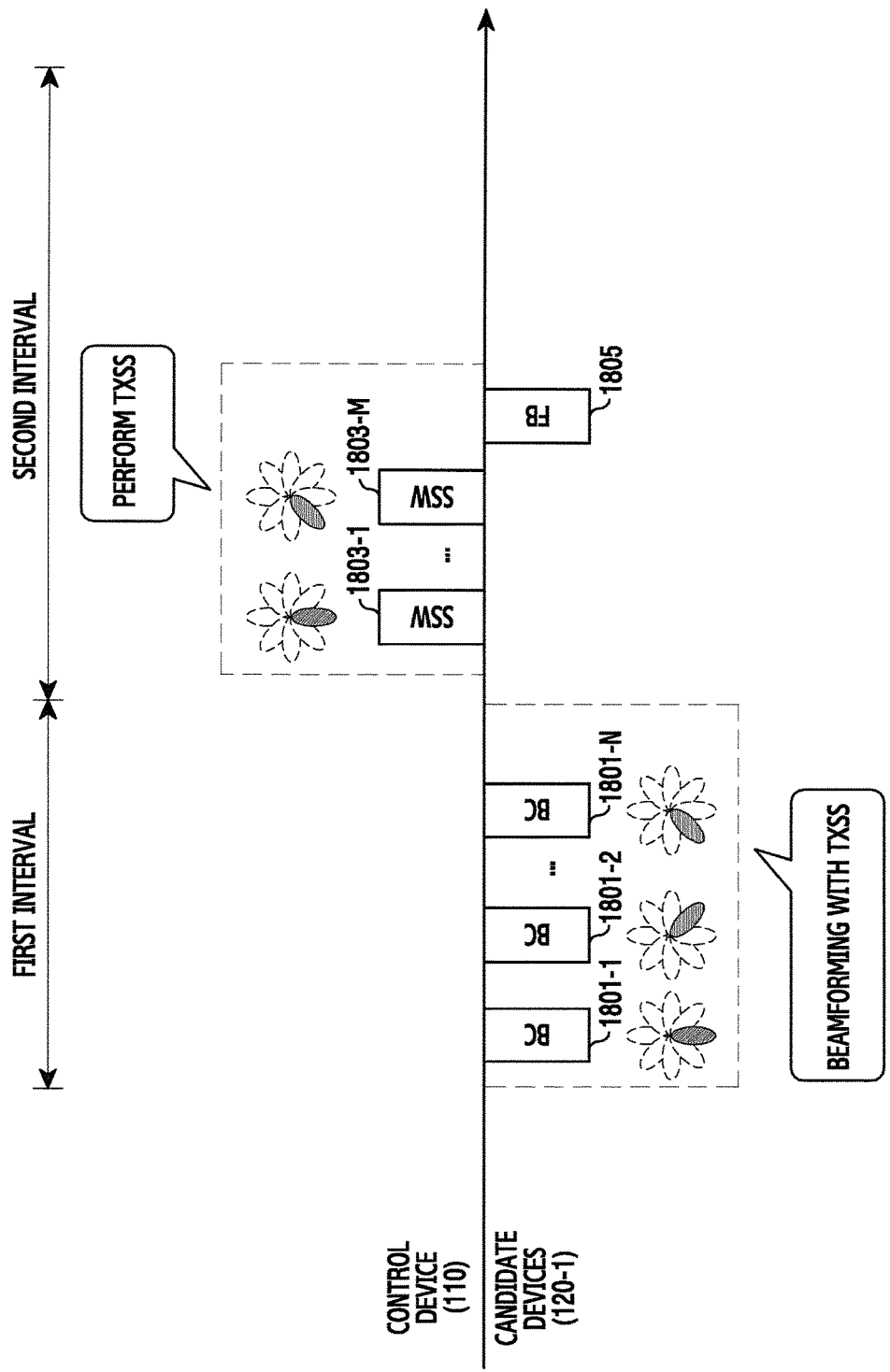
FIG. 18 illustrates reverse beam training in a wireless communication system according to another embodiment of the present disclosure.

FIG. 18 depicts reverse beam training in a wireless communication system according to another embodiment of the present disclosure. FIG. 18 depicts reverse beam training between the control device 110 and the candidate device 120-1. When a plurality of candidate devices is selected, the process of FIG. 18 can be iteratively applied to the candidate devices.

Referring to FIG. 18, the candidate device 120-1 performs TXSS during a first interval. That is, the candidate device 120-1 beamforms beacon signals in supportable beam directions and sequentially transmits the beamformed beacon signals 1801-1 through 1801-N. In so doing, the control device 110 stands by in a listen state. That is, the control device 110 tries to detect the beamformed beacon signals 1801-1 through 1801-N. The control device 110 receives the beacon signals 1801-1 through 1801-N over an omni-directional RX beam without RX beamforming. Hence, the control device 110 can determine an optimal TX beam of a reverse link. Although not depicted in FIG. 18, the control device 110 can feed information notifying the optimal TX beam back. Next, the control device conducts TXSS during a second interval. The candidate device 120-1 receives a training signal from the control device 110 over an omni-directional RX beam without RX beamforming and then sends feedback information to the control device 110. Herein, the feedback information can be transmitted without beamforming, that is, over the omni-directional beam. More specifically, the candidate device 120-1 beamforms training signals in supportable beam directions, sequentially transmits the beamformed training signals 1803-1 through 1803-N, and transmits feedback information 1805 to the control device 110.

As above, the devices can determine the communication over the synchronized discovery interval and the optimal beam. Further, the present disclosure allows a user having no intention of sharing contents to selectively respond to a band switching request. Thus, it is possible to prevent energy waste due to user's unnecessary device enabling and to block user's location information from being exposed to an unintended user in some cases.

The selective response to the band switching request can be achieved by pre-defining a communication module enabling range for the second RAT. For example, the device can restrict the range, rather than permitting every request, to a case where a request is received from a user of a stored contact, a case where proximity is determined, or a case where the user selects the permission. In so doing, information for the pre-determination can be exchanged or acquired through the auxiliary communication module, that is, the communication module for the first RAT.

Further, when devices not setting a data link enable the communication module for the second RAT, a process for disabling the communication module is required. For doing so, the control device 110 can send a list of devices discovered in the IB and a list of devices selected for the link setup to the candidate devices 120 using the auxiliary communication module. The communication module for the second RAT can be disabled as shown in FIG. 19.

Figure 19:
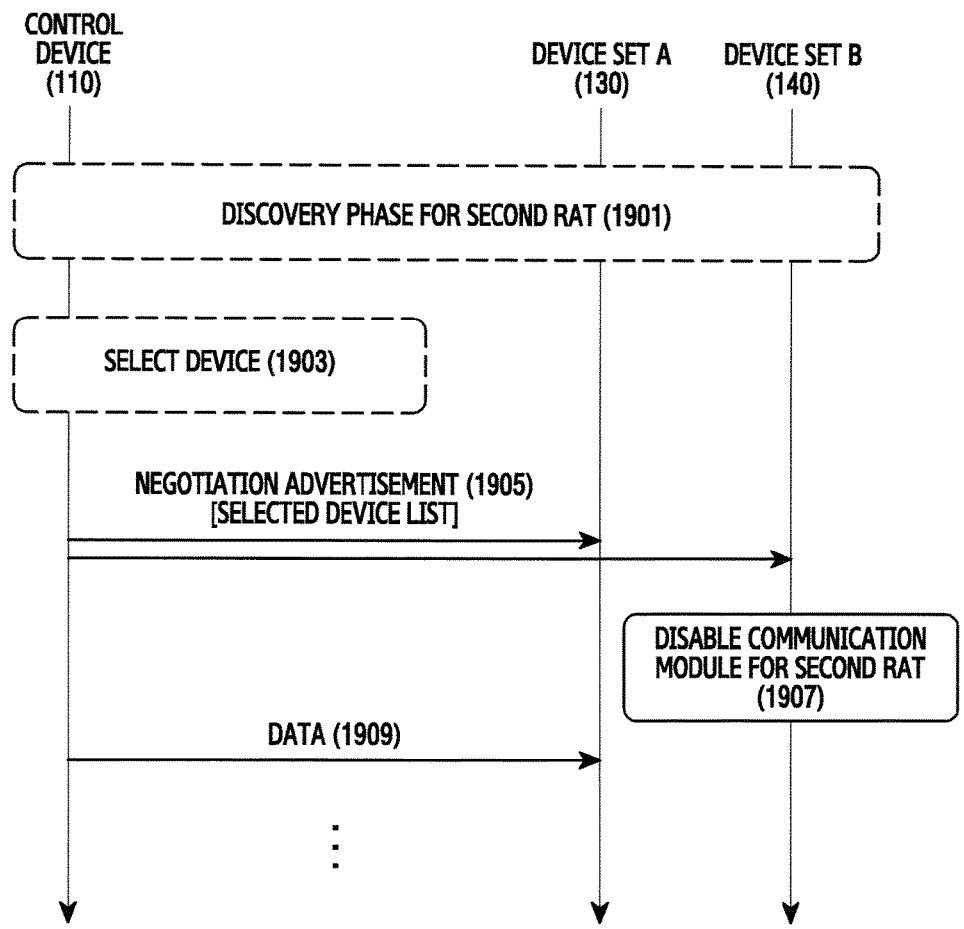
FIG. 19 illustrates disabling of a communication module in a wireless communication system according to an embodiment of the present disclosure.

FIG. 19 depicts disabling of a communication module in a wireless communication system according to an embodiment of the present disclosure. In FIG. 19, devices belonging to a device set A 130 are selected from the candidate devices 120, and data communication modules of devices belonging to a device set B 140 are disabled.

Referring to FIG. 19, a discovery phase for a second RAT (e.g., WiGig) is performed in operation 1901. For example, the discovery phase can be conducted as shown in FIG. 11 or FIG. 15. Thus, the control device 110 can determine communicable devices among the candidate devices 120.

In operation 1903, the control device 110 selects at least one device for data communication. The control device 110 selects at least one of the communicable devices using the second RAT. For example, the control device 110 can select at least one device according to a predefined rule or a user's selection. Herein, the device set A 130 is selected.

In operation 1905, the control device 110 sends a negotiation advertisement signal to the device set A 130 and the device set B 140. The negotiation advertisement includes identification information of at least one device for the data communication using the second RAT. The negotiation advertisement includes identification information of devices of the device set A 130. Herein, the negotiation advertisement signal is transmitted using the first RAT. For example, the negotiation advertisement signal can be carried by a BLE advertisement frame.

In operation 1907, the devices of the device set B 140 disable their communication module for the second RAT. That is, the devices of the device set B 140 can control to turn off the communication module for the second RAT or to change the communication module for the second RAT into a sleep state. Yet, for other purposes than the communication with the control device 110, the devices of the device set B 140 can keep the communication module for the second RAT enabled.

In operation 1909, the control device 110 transmits data to the devices of the device set A 130. The data is transmitted using the second RAT. More specifically, the control device 110 beamforms a signal including the data and then transmits the beamformed signal. The data can be unicast, multicast, or broadcast.

Figure 20:
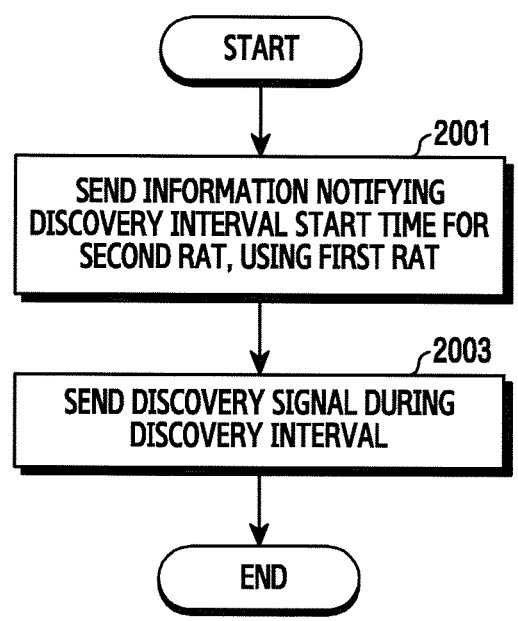
FIG. 20 illustrates operations of a control device in a wireless communication system according to an embodiment of the present disclosure.

FIG. 20 illustrates operations of a control device in a wireless communication system according to an embodiment of the present disclosure. The control device supports a first RAT and a second RAT. Compared with the first RAT, the second RAT uses a higher frequency. The first RAT can consume less power than the second RAT.

Referring to FIG. 20, in operation 2001, the control device transmits information notifying a discovery interval start time for the second RAT, using the first RAT. The information notifying the discovery interval start time is delivered by a first RAT broadcasting signal, and the broadcasting signal can further include personal identification information of the control device. For example, the information notifying the discovery interval start time includes at least one parameter indicating a remaining time from the information transmission until the start time. The information notifying the discovery interval start time can be iteratively transmitted. In this case, the information notifying the discovery interval start time decreases in every transmission.

In operation 2003, the control device transmits a discovery signal during the discovery interval using the second RAT. Herein, the discovery signal can be a beacon frame. The discovery interval includes a first interval and a second interval. During the first interval, the control device transmits TX-beamformed signals in a plurality of directions. In the first interval, a plurality of candidate devices is in a listen state. During the second interval, the control device transmits the discovery signal using an omni-directional beam. According to another embodiment of the present disclosure, in the second interval, the control device can detect signals TX-beamformed by the candidate devices, without sending the discovery signals. In this case, the control device can distribute slots of the second interval to the candidate devices and receive signals from corresponding candidate devices in the slots. Further, the control device can send feedback notifying the detection result to the corresponding candidate device in each slot. Herein, the slots can be allocated prior to the operation 2003, and the allocation result is transmitted using the first RAT.

Although not depicted in FIG. 20, the control device can transmit the information indicating the discovery interval start time and then receive an ACK from at least one candidate device. In this case, when receiving ACKs from all of the candidate devices, the control device can suspend the transmission of the information indicating the discovery interval start time. For doing so, the control device can determine the candidate devices prior to the operation 2001. For example, the control device can determine the candidate devices by conducting the discovery process using the first RAT or identifying data sharing devices using the second RAT.

Although not depicted in FIG. 20, after the operation 2003, the control device can send a signal notifying a list of at least one candidate device for data sharing. In this case, some devices not included in the list among the candidate devices can avoid unnecessary power consumption by disabling the communication module for the second RAT.

Figure 21:
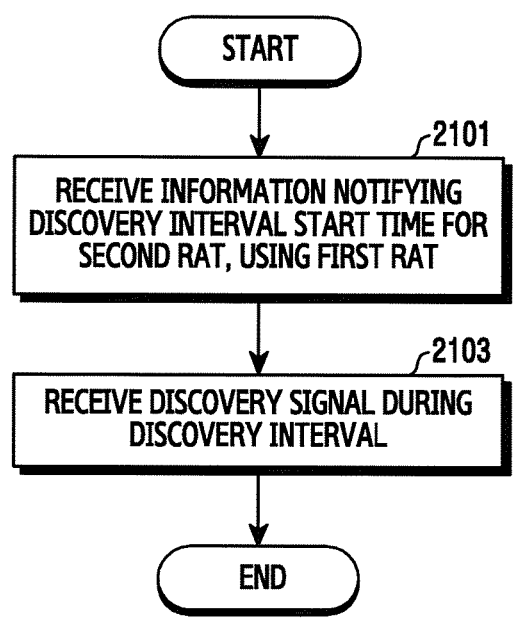
FIG. 21 illustrates operations of a candidate device in a wireless communication system according to an embodiment of the present disclosure.

FIG. 21 illustrates operations of a candidate device in a wireless communication system according to an embodiment of the present disclosure. The candidate device supports a first RAT and a second RAT. Compared with the first RAT, the second RAT uses a higher frequency. The first RAT can consume less power than the second RAT.

Referring to FIG. 21, in operation 2101, the candidate device receives information indicating a discovery interval start time for the second RAT, using the first RAT. The control device sends the information indicating the discovery interval start time using a first RAT broadcasting signal, and the broadcasting signal can further include personal identification information of the control device. For example, the information notifying the discovery interval start time includes at least one parameter indicating a remaining time from the information transmission until the start time. The information notifying the discovery interval start time can be iteratively transmitted. In this case, the information notifying the discovery interval start time decreases in every transmission.

In operation 2103, the candidate device receives a discovery signal during the discovery interval using the second RAT. Herein, the discovery signal can be a beacon frame. The discovery interval includes a first interval and a second interval. During the first interval, the candidate device detects one of signals TX-beamformed by the control device in a plurality of directions. In the first interval, a plurality of devices including the candidate device is in a listen state. During the second interval, the candidate device detects at least one of discovery signals received from the control device over an omni-directional beam. According to another embodiment of the present disclosure, during the second interval, the candidate device can send the discovery signals TX-beamformed to different directions in its allocated slot, without detecting the discovery signals. In this case, the candidate device can receive the slot allocation result of the second interval from the control device. Further, the candidate device can receive from the control device feedback notifying the detection result of the signals transmitted to the candidate device. Herein, the slots can be allocated prior to the operation 2103, and the allocation result is transmitted using the first RAT.

Although not depicted in FIG. 21, the candidate device can receive the information indicating the discovery interval start time and then send the ACK to the control device. The ACK can include identification information of the candidate device.

Unlike the method of FIG. 21, the candidate device may not detect the discovery signal in operation 2103. In this case, the candidate device can receive a signal notifying a list of at least one candidate device for sharing data, from the control device using the first RAT. When the candidate device is not included in the list, the candidate device can disable the communication module for the second RAT and thus avoid unnecessary power consumption.

Figure 22:
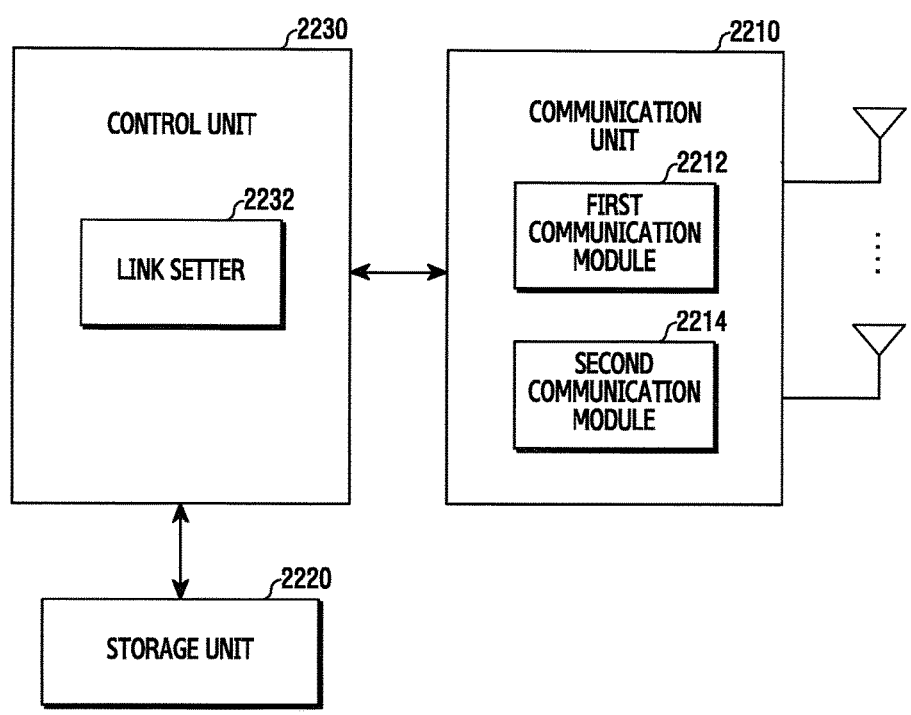
FIG. 22 illustrates a device in a wireless communication system according to an embodiment of the present disclosure.

FIG. 22 is a block diagram of a device in a wireless communication system according to an embodiment of the present disclosure. Hereinafter, a term such as a unit, a part, or like, represents a unit for processing at least one function or operation, and can be implemented using hardware alone or hardware in combination with software.

Referring to FIG. 22, the device includes a communication unit 2210, a storage unit 2220, and a control unit 2230.

The communication unit 2210 sends and receives signals over a radio channel. For example, the communication unit 2210 converts a baseband signal to a bit string and vice versa according to a physical layer standard of the system. For the data transmission, the communication unit 2210 generates complex symbols by encoding and modulating a transmit bit string. In data reception, the communication unit 2210 restores the received bit string by demodulating and decoding the baseband signal. The communication unit 2210 up-converts the baseband signal to a Radio Frequency (RF) signal, transmits the RF signal over an antenna, and down-converts an RF signal received over the antenna to a baseband signal. For example, the communication unit 2210 can include a transmit filter, a receive filter, an amplifier, a mixer, an oscillator, a Digital to Analog Converter (DAC), and an Analog to Digital Converter (ADC).

The communication unit 2210 can include a plurality of RF chains. The communication unit 2210 can conduct the beamforming. For the beamforming, the communication unit 2210 can adjust a phase and an amplitude of signals transmitted and received via a plurality of antennas or antenna elements. The communication unit 2210 can include a plurality of communication modules 2212 and 2214 for supporting different RATs. Also, the communication unit 2210 can include different communication modules 2212 and 2214 for processing signals of different frequency bands. For example, the first module 2212 supports a first RAT, and the second module 2214 supports a second RAT. The second RAT uses a higher frequency than the first RAT. For example, the different RATs can include NFC, BLE, Wi-Fi, WiGig, cellular networks (e.g., Long Term Evolution (LTE)), and the like. The different frequency bands can include Super High Frequency (SHF) band (e.g., 2.5 GHz, 5 GHz) and millimeter (mm) wave band (e.g., 60 GHz).

The communication unit 2210 sends and receives signals as stated above. Hence, the communication unit 2210 can be referred to as a transmitter, a receiver, or a transceiver.

The storage unit 2220 stores a basic program for operations of the device, an application program, and data such as setting information. For example, the storage unit 2220 can store data sharing history using the second RAT. For example, the history can include a list of other devices sharing the data using the second RAT. The storage unit 2220 provides the stored data according to a request of the control unit 2230.

The control unit 2230 controls the operations of the device. For example, the control unit 2230 sends and receives the signals through the communication unit 2210. The control unit 2230 records and reads data to and from the storage unit 2220. For doing so, the control unit 2230 can include at least one processor. For example, the control unit 2230 can include a Communication Processor (CP) for controlling the communication or an Application Processor (AP) for controlling a higher layer such as an application. The control unit 2230 includes a link setter 2232 for controlling the link setup based on the interoperation of different RATs using the first module 2212 and the second module 2214. For example, the control unit 2230 can control the device to serve as the control device 110 or one of the candidate devices 120 as described in FIG. 5 through FIG. 21. The control unit 2230 operates as follows.

When the device serves as the control device, the control unit 2230 transmits information notifying a discovery interval start time for the second RAT, through the first module 2212. The information notifying the discovery interval start time is delivered by a first RAT broadcasting signal, and the broadcasting signal can further include personal identification information of the control device. For example, the information notifying the discovery interval start time includes at least one parameter indicating a remaining time from the transmission of the information notifying the discovery interval start time until the start time. The control unit 2230 transmits a discovery signal during the discovery interval through the second module 2214. During the first interval of the discovery interval, the control unit 2230 transmits TX-beamformed signals in a plurality of directions through the second module 2214. During the second interval of the discovery interval, the control unit 2230 transmits the discovery signal using an omni-directional beam through the second module 2214. According to another embodiment of the present disclosure, in the second interval, the control unit 2230 can detect signals TX-beamformed by the candidate devices, without sending the discovery signals. In this case, the control unit 2230 can distribute slots of the second interval to the candidate devices before the first interval, send the slot allocation result through the first module 221, and receive signals from corresponding candidate devices in the slots. Further, the control unit 2230 can send feedback notifying the detection result to the corresponding candidate device in each slot.

When the device serves as the control device, the control unit 2230 can transmit the information indicating the discovery interval start time and then receive an ACK from at least one candidate device. In this case, when receiving ACKs from all of the candidate devices, the control unit 2230 can suspend the transmission of the information indicating the discovery interval start time. For doing so, the control unit 2230 can determine the candidate devices prior to the operation 2001. For example, the control unit 2230 can determine the candidate devices by conducting the discovery process using the first RAT or identifying data sharing devices using the second RAT.

When the device serves as the control device, the control unit 2230 can send a signal notifying a list of at least one candidate device for data sharing. In this case, some devices not included in the list among the candidate devices can avoid unnecessary power consumption by disabling the communication module for the second RAT.

When the device serves as the candidate device, the control unit 2230 receives information indicating a discovery interval start time for the second RAT, through the first module 2212. The control unit 2230 receives a discovery signal during the discovery interval through the second module 2214. During the first interval of the discovery interval, the control unit 2230 detects one of TX-beamformed signals from the control device in a plurality of directions. During the second interval of the discovery interval, the control unit 2230 detects at least one of discovery signals from the control device over an omni-directional beam. According to another embodiment of the present disclosure, during the second interval, the control unit 2230 can control to send the discovery signals TX-beamformed in different directions in its allocated slot, without detecting the discovery signals. In this case, the control unit 2230 can receive the slot allocation result of the second interval from the control device, and receive from the control device feedback notifying the detection result of the signals transmitted to the candidate device.

When the device serves as the candidate device, the control unit 2230 can receive information indicating the discovery interval start time and then send an ACK to the control device. The ACK can include identification information of the candidate device.

When the device serves as the candidate device, the control unit 2230 can fail in the discovery signal detection. In this case, the control unit 2230 can receive a signal notifying a list of at least one candidate device for data sharing, from the control device through the first module 2212. When the candidate device is not included in the list, the control unit 2230 can disable the second module 2214 and thus avoid unnecessary power consumption.

The control unit 2230 can control to display at least one item indicating at least one neighboring device discovered. For doing so, although not depicted in FIG. 22, the electronic device can further include a UI module for outputting information and detecting a user's input under the control of the control unit 2230. The UI module can include at least one hardware module for the outputting and the inputting. For example, the hardware module can include at least one of a sensor, a keyboard, a keypad, a speaker, a microphone, a touch screen, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), and a Flexible LED (FLED). Since the UI module can include a display means, it can be referred to as a display unit.

When the control device and the candidate devices can communicate with each other using the second RAT, a distance and an angle between the devices can be further estimated. The distance and the angle can be used for the user to select a device for sharing contents or a service from the candidate devices. UI/UX for the content or service sharing can be configured as follows.

Figure 23B:
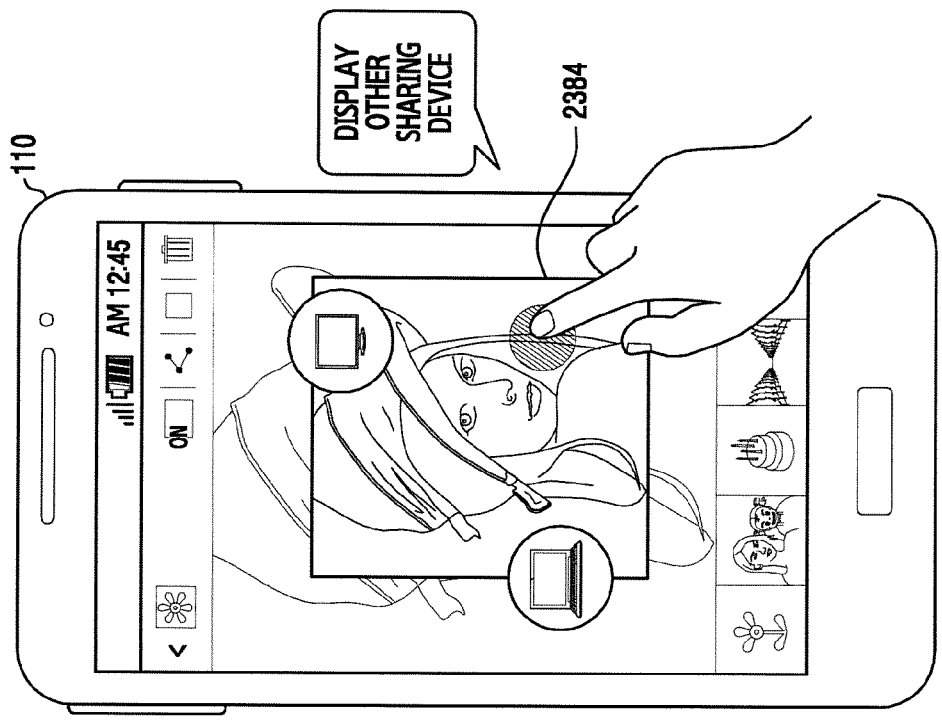
FIGS. 23A and 23B illustrate an interface for content sharing using link setup according to an embodiment of the present disclosure.
Figure 23A:
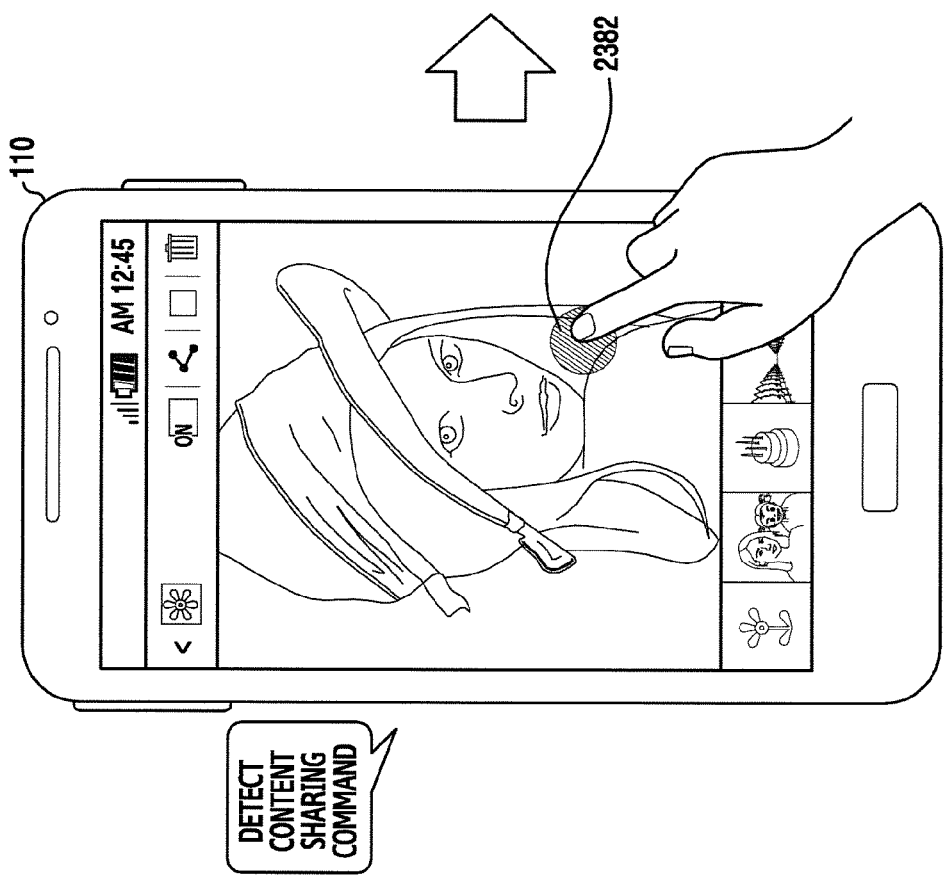

FIGS. 23A and 23B depict an interface for content sharing using link setup according to an embodiment of the present disclosure. That is, the link setup is utilized. FIGS. 23A and 23B show a UI/UX for the data sharing provided from the control device 110 to the user.

Referring to FIG. 23A, the control device 110 executes an application which displays image contents. Hence, the control device 110 displays a list of images and a selected image. To share the selected image, the user applies a predefined touch input to a point 2382 on a region displaying the selected image. The predefined touch input is to share data and can be defined as a long press. The long press is a touch input pressing one point over a certain time. For example, the certain time can be defined as one or two seconds. The control device 110 detects a content sharing command.

Referring to FIG. 23B, the control device 110 displays other devices for data sharing. More specifically, the control device 110 displays a UI 2384 showing other sharing devices in an image displaying region. The UI 2384 can be referred to as a neighboring device map. The UI 2384 includes a thumbnail or a reduced image of the selected image, and includes items notifying the other sharing devices. According to another embodiment of the present disclosure, the thumbnail or the reduced image can be omitted. That is, upon detecting the content sharing command, the control device 110 can perform the present link setup. That is, the control device 110 carries out the method of FIG. 3 using the first RAT and the second RAT, identifies devices for the link setup using the second RAT, and then displays the link setup devices on the UI 2384.

With the UI/UX of FIGS. 23A and 23B, the user can effectively achieve instantaneous data sharing during content browsing. Further, the link setup allows the data sharing during a short time.

Figure 24:
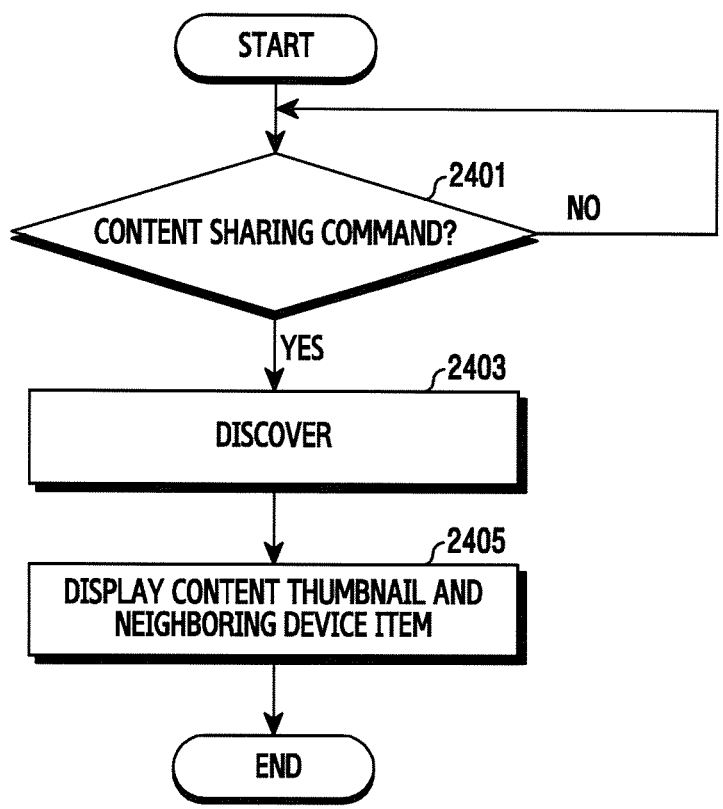
FIG. 24 illustrates a content sharing method using link setup according to an embodiment of the present disclosure.

FIG. 24 is a flowchart of a content sharing method using link setup according to an embodiment of the present disclosure. FIG. 24 illustrates operations of the control device 110 for providing the interface of FIGS. 23A and 23B.

Referring to FIG. 24, the control device 110 determines whether a content sharing command occurs in operation 2401. The control device 110 is displaying contents (e.g., photos, videos, etc.). Upon detecting a predefined user input, the control device 110 can recognize the content sharing command. For example, the predefined user input can be defined as a long press at a fixed point over a certain time.

When detecting the sharing command, the control device 110 performs the discovery in operation 2403. That is, the control device 110 executes the method of FIG. 3 using the first RAT and the second RAT. More specifically, the control device 110 can send information notifying a discovery interval start time for the second RAT, using the first RAT, and then send a discovery signal using the second RAT during the discovery interval. Further, the control device 110 can estimate an angle and a distance of at least one neighboring device discovered.

In operation 2405, the control device 110 displays a content thumbnail and at least one item indicating the at least one neighboring device. Herein, the at least one item is displayed according to the angle. Specifically, the at least one item is displayed at a location corresponding to the angle based on the thumbnail. The item can indicate a type of the corresponding neighboring device or owner's identification information. For example, the thumbnail and the at least one item can be displayed as shown in FIG. 23B.

The interface of FIG. 23B represents a location of at least one neighboring device on a two-dimensional plane. However, a real space is three-dimensional and a location includes a height. Since the two-dimensional representation of FIGS. 23A and 23B cannot distinguish the height, it is hard for the user to select a connection device. To address such a difficulty, the device can provide an interface of FIGS. 25A through 25D according to another embodiment of the present disclosure.

FIGS. 25A through 25D depict interfaces displaying neighboring devices in an electronic device according to an embodiment of the present disclosure. That is, FIGS. 25A through 25D depict another application of the present link setup. In FIGS. 25A through 25D, the control device 110 provides a UI/UX for data sharing to the user.

Referring to FIG. 25A, neighboring devices 2520-1, 2520-2, and 2520-3 are positioned at the same coordinates on an x-y plane and at different coordinates on a z-axis. That is, the locations of the neighboring devices 2520-1, 2520-2, and 2520-3 are distinguished based on the height in FIG. 25A. The device can discover the neighboring devices 2520-1, 2520-2, and 2520-3, and then display the neighboring devices 2520-1, 2520-2, and 2520-3 using the interface of FIG. 25B, 25C, or 25D. In FIGS. 25B, 25C, and 25D, items of the neighboring devices 2520-1, 2520-2, and 2520-3 are configured in similar shapes to the neighboring devices 2520-1, 2520-2, and 2520-3. According to another embodiment of the present disclosure, items can employ different shapes and colors.

Referring to FIG. 25B, the device represents a three-dimensional space and displays the neighboring devices 2520-1, 2520-2, and 2520-3 in the three-dimensional space. The device can further display other neighboring devices. To enhance visibility of the three-dimensional space, the device can also display a guide line as expressed as dotted lines in FIG. 25B. According to another embodiment of the present disclosure, the guide line can be omitted.

Referring to FIG. 25C, the device displays a two-dimensional map. Yet, when other devices with different heights overlap at the same location on the two-dimensional plane, the device groups the other devices and then displays them vertically. That is, the device groups and displays the neighboring devices 2520-1, 2520-2, and 2520-3 vertically. The grouping can be represented as a polygon as expressed as an alternated long and short dash line of FIG. 25C, and the height of the neighboring devices 2520-1, 2520-2, and 2520-3 can be represented using breadth changes of the polygon. Alternatively or additionally, the device can represent the height by displaying the lower device item smaller than the higher device.

Referring to FIG. 25D, the device displays a two-dimensional map. Unlike FIGS. 23A and 23B, the device displays a y-z plane, rather than the x-y plane. Hence, the neighboring devices 2520-1, 2520-2, and 2520-3 of the different heights are distinguished vertically on a screen. That is, the representation is based on top, bottom, left, and right, rather than front, back, left, and right.

The above-described methods according to claims or various embodiments of the present disclosure can be implemented in software, firmware, hardware, or in their combinations.

As for the software, a computer-readable storage medium storing one or more programs (software modules) can be provided. One or more programs stored in the computer-readable storage medium can be configured for execution by one or more processors of the electronic device. One or more programs can include instructions for controlling the electronic device to execute the methods according to the exemplary embodiments of the present disclosure.

Such a program (software module, software) can be stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the programs can be stored to a memory combining part or all of those recording media. A plurality of memories may be equipped.

The programs can be stored in an attachable storage device accessible via a communication network such as Internet, Intranet, Local Area Network (LAN), WLAN, or Storage Area Network (SAN), or a communication network by combining these networks. The storage device can access the electronic device through an external port. A separate storage device may access the electronic device over the communication network.

As set forth above, the link setup can be accomplished more efficiently by synchronizing the discovery interval using different RATs in the wireless communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a device supporting a first radio access technology (RAT) and a second RAT, comprising:
    transmitting, by using the first RAT, to a plurality of other devices, a message to identify a start time of a discovery interval for the second RAT, and to notify a band switching; and
    transmitting, by using the second RAT, to the plurality of other devices, discovery signals through a plurality of beams during the discovery interval,
    wherein the first RAT provides a coverage that is wider than the second RAT.

2. The method of claim 1, further comprising:
    adjusting a beamwidth of the discovery signals based on at least one of signal strength of the first RAT and a service attribute using the second RAT.

3. The method of claim 1, further comprising:
    transmitting information regarding at least one of a discovery signal beamwidth and a number of beam sectors of the discovery signal, by using the first RAT.

4. The method of claim 1, further comprising:
    receiving an acknowledgement (ACK) responding to the message; and
    if receiving the ACK from all of candidate devices, suspending transmitting of the message.

5. The method of claim 1, further comprising:
    allocating slots of the discovery interval to the plurality of other devices;
    detecting a discovery signal transmit (TX)-beamformed by each of the plurality of other devices in the slots; and
    transmitting feedback notifying a discovery signal detection result, to each of the plurality of other devices.

6. The method of claim 1, further comprising:
    transmitting a signal notifying a list of at least one other device for data sharing.

7. The method of claim 1, wherein the message comprises information which represents a remaining time period until the band switching is performed.

8. A device for supporting a first radio access technology (RAT) and a second RAT, comprising:
    a first transceiver configured to transmit, by using the first RAT, to a plurality of other devices, a message to identify a start time of a discovery interval for the second RAT, and to notify a band switching; and
    a second transceiver configured to transmit, by using the second RAT, to the plurality of other device, discovery signals through a plurality of beams during the discovery interval,
    wherein the first RAT provides a coverage that is wider than the second RAT.

9. The device of claim 8, further comprising:
    at least one processor configured to adjust a beamwidth of the discovery signals based on at least one of signal strength of the first RAT and a service attribute using the second RAT.

10. The device of claim 8, wherein the first transceiver is further configured to transmit information regarding at least one of a discovery signal beamwidth and a number of beam sectors of the discovery signal, by using the first RAT.

11. The device of claim 8, wherein the first transceiver is further configured to receive an acknowledgement (ACK) responding to the message, and further comprising:
    at least one processor configured to, if receiving the ACK from all of candidate devices, suspend transmitting of the message.

12. The device of claim 8, further comprising:
    at least one processor configured to allocate slots of the discovery interval to the plurality of other devices, wherein the second transceiver is further configured to detect a discovery signal transmit (TX)-beamformed by each of the plurality of other devices in the slots and transmit feedback notifying a discovery signal detection result to each of the plurality of other devices.

13. The device of claim 8, wherein the first transceiver is further configured to transmit a signal notifying a list of at least one other device for data sharing.

14. The device of claim 8, wherein the message comprises information which represents a remaining time period until the band switching is performed.

15. A device for supporting a first radio access technology (RAT) and a second RAT, comprising:
   a first transceiver configured to receive, by using the first RAT, a message to identify a start time of a discovery interval for the second RAT, and to notify a band switching; and
   a second transceiver configured to receive, by using the second RAT, discovery signals during the discovery interval,
   wherein the discovery signals are transmitted through a plurality of beams, and
   wherein the first RAT provides a coverage that is wider than the second RAT.

16. The device of claim 15, wherein the first transceiver is further configured to receive information regarding at least one of a discovery signal beamwidth and a number of beam sectors of the discovery signal, by using the first RAT.

17. The device of claim 15, wherein the first transceiver is further configured to transmit an acknowledgement (ACK) in response to the received message.

18. The device of claim 15, wherein:
   the first transceiver is further configured to receive allocation information of slots of the discovery interval from a control device, and
   the second transceiver is further configured to transmit discovery signals TX-beamformed in different directions during a slot allocated to the device and receive feedback notifying a discovery signal detection result from the control device.

19. The device of claim 15, wherein the message comprises information which represents a remaining time period until the band switching is performed.

20. The device of claim 15, wherein the second transceiver is further configured to transmitting a feedback signal indicating at least one of the plurality of beams.

* * * * *